United States Patent
Jeong et al.

(10) Patent No.: US 12,530,431 B2
(45) Date of Patent: Jan. 20, 2026

(54) REINFORCEMENT LEARNING SYSTEMS FOR CONTROLLING WIRELESS COMMUNICATION NETWORKS

(71) Applicant: Telefonaktiebolaget LM Ericsson (publ), Stockholm (SE)

(72) Inventors: Jaeseong Jeong, Solna (SE); Lukas Bjarre, Hägersten (SE); Martin Isaksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 972 days.

(21) Appl. No.: 17/763,928

(22) PCT Filed: Oct. 1, 2020

(86) PCT No.: PCT/EP2020/077576
§ 371 (c)(1),
(2) Date: Mar. 25, 2022

(87) PCT Pub. No.: WO2021/069309
PCT Pub. Date: Apr. 15, 2021

(65) Prior Publication Data
US 2022/0343117 A1    Oct. 27, 2022

Related U.S. Application Data

(60) Provisional application No. 62/913,395, filed on Oct. 10, 2019.

(51) Int. Cl.
*G06F 18/21* (2023.01)
*G06N 20/00* (2019.01)
(Continued)

(52) U.S. Cl.
CPC ........... *G06F 18/217* (2023.01); *G06N 20/00* (2019.01); *H04W 16/22* (2013.01); *H04W 24/10* (2013.01)

(58) Field of Classification Search
CPC ........ G06F 18/217; G06N 20/00; G06N 7/01; G06N 3/006; G06N 3/084; H04W 16/22; H04W 24/10
See application file for complete search history.

(56) References Cited

PUBLICATIONS

International Search Report and Written Opinion of the International Searching Authority for PCT International Application No. PCT/EP2020/077576 dated Feb. 23, 2021.
(Continued)

*Primary Examiner* — Pei Yong Weng
(74) *Attorney, Agent, or Firm* — Sage Patent Group

(57) ABSTRACT

A computer implemented method of training a reinforcement learning model for controlling a dynamic system includes generating a trajectory sample of a simulated system that corresponds to the dynamic system, the trajectory sample including a current state $s_t$ of the simulated system at time t, an action $a_t$ taken on the simulated system at time t according to a policy $\pi$, a subsequent state $s_{t+1}$ of the simulated system following the action $a_t$, and a reward r associated with the action at, and estimating a robust target value $V^\pi(s_t)$ for the trajectory sample, wherein the robust target value $V^\pi(s_t)$ includes an expected value of a sum of the reward r and a minimum estimated value $V^\pi(s_{t+1})$ of the simulated system at the subsequent state $s_{t+1}$ based on a plurality of transition possibilities p from the current state $s_t$ in response to the action $a_t$. The method updates a value function estimator based on the robust target value, and updates the policy based on the trajectory and the value function estimator.

20 Claims, 20 Drawing Sheets

(51) Int. Cl.
　　　*H04W 16/22*　　　(2009.01)
　　　*H04W 24/10*　　　(2009.01)

(56) References Cited

PUBLICATIONS

Derman et al., "A Bayesian Approach to Robust Reinforcement Learning," UAI (2019), 2 pages.
Pinto et al., "Robust Adversarial Reinforcement Learning," ICML'17: Proceedings of the 34th International Conference on Machine Learning—vol. 70, Aug. 2017: pp. 2817-2826.
Fersman et al., "Artificial intelligence and machine learning in next-generation systems—Ericsson," White Paper, Ericsson, 2018, 16 pages.
Schulman et al., "Proximal Policy Optimization Algorithms," ArXiv abs/1707.06347 (2017): pp. 1-13.
"Part 2: Kinds of RL Algorithms," OpenAI Spinning Up, https://spinningup.openai.com/en/latest/spinningup/rl_intro2.html, 2018, 5 pages.

Algorithm 1: Gradient based method for solving the inner problem.

Input: Batch of states $S$
    Input: Value function $V_\phi^\pi$
    Input: Hyperparamters $k, n, \rho$
1  Procedure RobustMinimization($S, V_\phi^\pi, k, n, \rho$):
2     $U(s) \leftarrow$ initialize $k$ points in $\mathcal{U}_\rho(s)$ for each $s \in S$
3     repeat $n$ times
4         foreach $s \in S$ do
5             foreach $u \in U(s)$ do
6                 $g \leftarrow -\nabla_x V_\phi^\pi(s + u)$
7                 $u \leftarrow$ take gradient step using $g$
8                 if $\|u\|_2 > \rho$ then
9                     $u \leftarrow \rho \frac{u}{\|u\|_2}$
10     return min $U(s)$ foreach $s \in S$

*FIGURE 6*

REINFORCEMENT LEARNING SYSTEMS FOR CONTROLLING WIRELESS COMMUNICATION NETWORKS

CROSS REFERENCE TO RELATED APPLICATION

The present application is a 35 U.S.C. § 371 national stage application of PCT International Application No. PCT/EP2020/077576 filed Oct. 1, 2020, which claims the benefit of and priority to U.S. Provisional Patent Application No. 62/913,395, filed Oct. 10, 2019, entitled "ROBUST VALUE FUNCTION ESTIMATION IN REINFORCEMENT LEARNING SYSTEMS," the disclosures and content of which are incorporated herein by reference in their entireties.

TECHNICAL FIELD

Inventive concepts described herein relate to wireless communication networks, and in particular to reinforcement learning systems for training machine learning based control systems for controlling wireless communication networks.

BACKGROUND

Reinforcement Learning (RL) is a data-driven approach of learning an optimal control policy. RL algorithms can learn effective policies without any explicit knowledge of the system or environment through interaction with the environment.

There many different RL algorithms that function to solve similar problems in slightly different manners. FIG. 1 illustrates a taxonomy of different families of RL algorithms. In particular, RL algorithms can generally be classified as model-based or model-free. Within the model-free category, RL algorithms can be classified as policy optimization or Q-learning algorithms. Policy optimization algorithms may be suitable for control of many types of complex systems.

Citations are provided below for references that are mentioned in the present disclosure.
[1] https://spinningup.openai.com/en/latest/spinningup/rl_intro2.html#a-taxonomy-of-rl-algorithms
[2] Schulman, John, et al. "Proximal policy optimization algorithms." arXiv preprint arXiv:1707.06347 (2017).
[3] E. Fersman, J. Forgeat, R. Coster, S. Kumar Mohalik, and V. Berggren, "Artificial intelligence and machine learning in next-generation systems," 2018-https://www.ericsson.com/en/white-papers/machine-intelligence

SUMMARY

With the introduction of fifth generation wireless technology (5G), there has been an increase in the complexity of controlling networks due to the presence of many more connected devices, the need for more computing resources, and the availability of more advanced protocols. Comprehending the complexity level of a 5G network is beyond human capabilities, and it is therefore impractical to tune the performance of such a system manually. For that reason, management of such systems may benefit from automation and Artificial Intelligence (AI). In particular, system management can apply some forms of AI that are inspired by behavioral psychology, and that are concerned with how software agents learn to take actions in an environment by interacting with it. In essence, such control systems "learn by doing" by taking an action based on a given system state according to a control policy, observing the response of the system, and adjusting the control policy according to the response.

There is a need for such control systems to have good performance from the time they are first implemented. Training a software control system (also referred to as a software agent, or more simply, an agent) in a real system can be slow and can lead to errors or inefficiency in the system while the agent is being trained. Therefore, it is customary to pretrain the agents in simulators that are approximations of the real systems. To implement AI in practice, it is important to deal with the problem of bridging the gap between simulators and reality.

An important component of many RL algorithms is the value function estimate. The value function is defined as the expected cumulative reward collected from a state given a policy ($\pi$). The value function can be used to evaluate many aspects of a given policy. The exact value function is typically unknown, but can be estimated through interaction between the control system and the environment. This may done by utilizing the Bellman Equation shown below for the value function, which expresses the value function in a recursive manner.

$$V^\pi(s_t) = r(s_t, a_t) + V^\pi(s_{t+1}) \qquad [1]$$

In equation [1], $s_t$ represents the state of the system being controlled at time t, $r(s_t, a_t)$ is a reward of an action a taken for a given state s at time t, and $V^\pi(s_t)$ is a value function estimate at state $s_t$. The reward is a signal from the environment that provides feedback on how desirable the current state of the system is. The goal of RL agents is to maximize the expected cumulative rewards given by the environment.

A computer implemented method of training a reinforcement learning model for controlling a dynamic system is disclosed. The method includes generating a trajectory sample of a simulated system that corresponds to the dynamic system, the trajectory sample including a current state $s_t$ of the simulated system at time t, an action $a_t$ taken on the simulated system at time t according to a policy $\pi$, a subsequent state $s_{t+1}$ of the simulated system following the action $a_t$, and a reward r associated with the action $a_t$. The method also includes estimating a robust target value $V^\pi(s_t)$ for the trajectory sample. The robust target value $V^\pi(s_t)$ includes an expected value of a sum of the reward r and a minimum estimated value $V^\pi(s_{t+1})$ of the simulated system at the subsequent state $s_{t+1}$ based on a plurality of transition possibilities p from the current state $s_t$ in response to the action $a_t$. The method updates a value function estimator based on the robust target value, and updates the policy based on the trajectory and the value function estimator.

Generating the trajectory sample may include estimating the current state $s_t$ at time t of the simulated system that corresponds to the dynamic system, simulating the action $a_t$ on the simulated system based on the current state $s_t$ according to the policy $\pi$, sampling the subsequent state $s_{t+1}$ at time t+1 of the simulated system following the action $a_t$, and estimating the reward r associated with the action $a_t$.

The method may further include generating the minimum estimated value $V^\pi(s_{t+1})$ of the simulated system at the subsequent state $s_{t+1}$ by estimating the value function at each of a plurality of target states near the subsequent state $s_{t+1}$ and selecting a minimum value of the value function at each of the plurality of target states.

Each of the plurality of target states may be within a predefined distance from the subsequent state $s_{t+1}$.

In some embodiments, the plurality of target states are selected from within a defined region of a state space containing the subsequent state $s_{t+1}$, and the method may further include performing a gradient search of the value function within the defined region to find the minimum estimated value $V^\pi(s_{t+1})$.

In some embodiments, the defined region of the state space includes an $L_2$ sphere $U_\rho(s_{t+1})$ within the state space centered on the subsequent state $s_{t+1}$ and having a radius $\rho$.

In some embodiments, performing the gradient search includes generating a gradient of the value function with respect to the state s (i.e., $\nabla_s V^\pi(s)$) at each of the plurality of states within the defined state space, taking a step along the gradient to a new point within the state space, determining whether the new point is within the defined region of state space, and in response to determining that the new point is outside the defined region of state space, normalizing the step so that the new point is within the defined region of state space, and estimating the value function at the new point.

In some embodiments, the minimum estimated value $V^\pi(s_{t+1})$ of the dynamic system is a discounted future value.

The method may further include providing the policy to a system controller for controlling the dynamic system using the updated policy.

In some embodiments, the dynamic system includes a wireless communication system, the state of the dynamic system includes a performance metric of the wireless communication system, and the action includes an uplink resource scheduling grant that allocates uplink transmission resources to a wireless terminal served by the wireless communication system.

In some embodiments, the dynamic system includes a wireless communication system, the state of the dynamic system includes a performance metric of the wireless communication system, and the action includes generation of a set of beamforming weights used to form a beam from a transceiver in the wireless communication system.

A policy training server according to some embodiments includes a processing circuit, and a memory coupled to the processing circuit and including computer readable program instructions that, when executed by the processing circuit, cause the policy training server to perform operations of generating a trajectory sample of a simulated system that corresponds to the dynamic system. The trajectory sample includes a current state $s_t$ of the simulated system at time t, an action at taken on the simulated system at time t according to a policy $\pi$, a subsequent state $s_{t+1}$ of the simulated system following the action $a_t$, and a reward r associated with the action $a_t$. The policy training server is further caused to perform estimating a robust target value $V^\pi(s_t)$ for the trajectory sample, wherein the robust target value $V^\pi(s_t)$ includes an expected value of a sum of the reward r and a minimum estimated value $V^\pi(s_{t+1})$ of the simulated system at the subsequent state $s_{t+1}$ based on a plurality of transition possibilities p from the current state $s_t$ in response to the action $a_t$. The policy training server is further caused to perform updating a value function estimator based on the robust target value, and updating the policy based on the trajectory and the value function estimator.

A policy training server according to some embodiments includes a trajectory generation module for generating a trajectory sample of a simulated system that corresponds to a dynamic system, the trajectory sample including a current state $s_t$ of the simulated system at time t, an action $a_t$ taken on the simulated system at time t according to a policy $\pi$, a subsequent state $s_{t+1}$ of the simulated system following the action $a_t$, and a reward r associated with the action $a_t$, a target value estimation module for estimating a robust target value $V^\pi(s_t)$ for the trajectory sample, wherein the robust target value $V^\pi(s_t)$ includes an expected value of a sum of the reward r and a minimum estimated value $V^\pi(s_{t+1})$ of the simulated system at the subsequent state $s_{t+1}$ based on a plurality of transition possibilities p from the current state $s_t$ in response to the action $a_t$, a value function updating module for updating a value function estimator based on the robust target value, and a policy updating module for updating the policy based on the trajectory and the value function estimator.

A computer implemented method of training a reinforcement learning model for controlling a wireless communication system is disclosed. The method includes generating a trajectory sample of a simulated system that corresponds to the wireless communication system. The trajectory sample includes a current state $s_t$ of the simulated system at time t, an action $a_t$ taken on the simulated system at time t according to a policy $\pi$, a subsequent state $s_{t+1}$ of the simulated system following the action $a_t$, and a reward r associated with the action $a_t$. The method includes estimating a robust target value $V^\pi(s_t)$ for the trajectory sample, wherein the robust target value $V^\pi(s_t)$ includes an expected value of a sum of the reward r and a minimum estimated value $V^\pi(s_{t+1})$ of the simulated system at the subsequent state $s_{t+1}$ based on a plurality of transition possibilities p from the current state $s_t$ in response to the action $a_t$. The method includes updating a value function estimator based on the robust target value, and updating the policy based on the trajectory and the value function estimator.

A policy training server according to some embodiments is disclosed. The policy training server includes a trajectory generation module for generating a trajectory sample of a simulated system that corresponds to a wireless communication system. The trajectory sample includes a current state $s_t$ of the simulated system at time t, an action $a_t$ taken on the simulated system at time t according to a policy $\pi$, a subsequent state $s_{t+1}$ of the simulated system following the action $a_t$, and a reward r associated with the action $a_t$. The policy training server includes a target value estimation module for estimating a robust target value $V^\pi(s_t)$ for the trajectory sample, wherein the robust target value $V^\pi(s_t)$ includes an expected value of a sum of the reward r and a minimum estimated value $V^\pi(s_{t+1})$ of the simulated system at the subsequent state $s_{t+1}$ based on a plurality of transition possibilities p from the current state $s_t$ in response to the action $a_t$. The policy training server further includes a value function updating module for updating a value function estimator based on the robust target value, and a policy updating module for updating the policy based on the trajectory and the value function estimator.

BRIEF DESCRIPTION OF THE DRAWINGS

FIG. 6 illustrates an algorithm for estimating a value function according to some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Sim to Reality: Robust Reinforcement Learning

Sim-to-Reality transfer in Reinforcement Learning is a method in in which the RL model (i.e., the control policy) is first trained in a virtual environment (e.g., using simulators) with sufficient exploration of the state space. The control policy is then transferred to the real environment to be implemented by a system controller. This is a promising approach for solving costly exploration in real systems, but it comes with the generalization problem of transferring RL models from simulators to real systems due to a gap between simulators and reality.

Figure 2A:
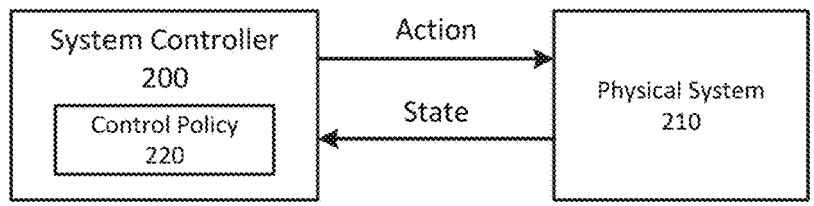
FIG. 2A illustrates a system controller that uses a policy trained through reinforcement learning for controlling a system.

FIG. 2A illustrates a system controller 200 that controls a physical system 210 according to a control policy 220. The system controller observes a state of the physical system 210, and then controls the physical system 210 by causing an action to be taken on the physical system 210. The action 210 is selected by the system controller 200 based on the observed state of the physical system and the control policy 220.

Figure 2B:
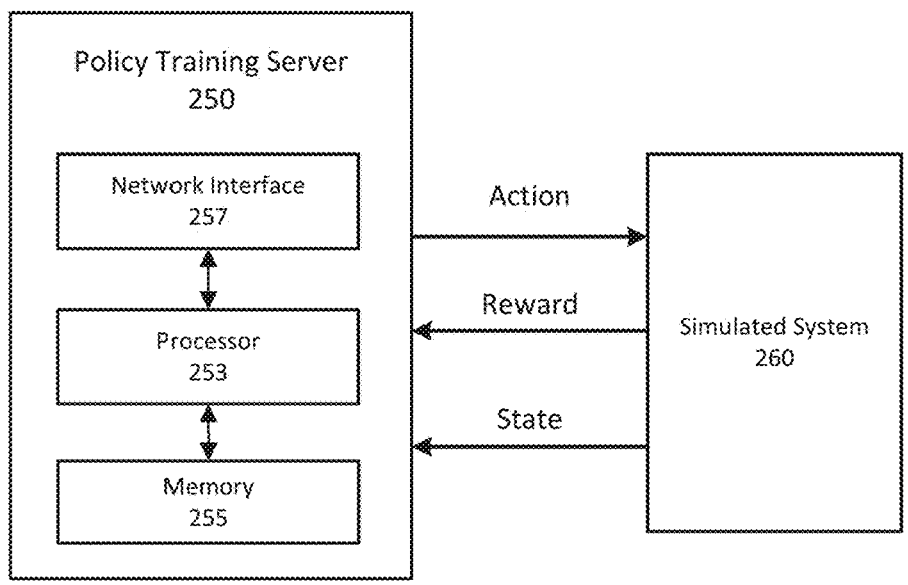
FIG. 2B illustrates a policy training server according to some embodiments.
Figure 2C:
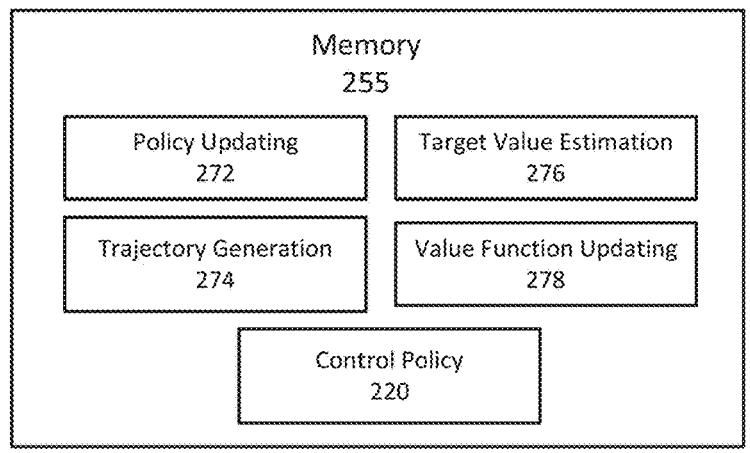
FIG. 2C illustrates functional modules of a policy training server according to some embodiments.

Referring to FIG. 2B, the control policy 220 may be trained by an agent, such as a policy training server 250, that interacts with a simulated system 260. The policy training server 250 includes a processing circuit 253, a network interface 257 coupled to the processing circuit 253 and a memory 255 coupled to the processing circuit 253. Referring to FIG. 2C, the memory 255 may store various functional modules, such as a policy updating module 272, a trajectory generation module 274, a target value estimation module 276 and a value function updating module 278 that contain executable code that is executable by the processing circuit 253 to perform the functions described herein. The memory 255 may further include a copy of the control policy 220, although the control policy 220 may alternatively or additionally be stored in an external data repository.

Referring to FIGS. 2B and 2C, the policy training server 250 may execute the functional modules to observe an initial state of the simulated system 260. Based on the control policy 220, the policy training server 250 may cause an action to be taken by/on the simulated system 260. The policy training server 250 observes the state transition of the simulated system 260 caused by the action from the initial state and a new state, and calculates or observes a reward associated with the state transition. Based on the reward, the policy training server 250 estimates a value associated with the initial state and estimates a value associated with the new state.

Robust reinforcement learning utilizes Robust Markov Decision Processes, which combines ideas from Reinforcement Learning and Robust Control to create agents with embedded uncertainty about the simulated environment, opting for pessimistic optimization in order to handle potential gaps between simulators and reality. Some embodiments described herein apply similar concepts to a state-of-the-art Deep Reinforcement Learning algorithm.

In particular, some embodiments are based on a realization that, while the location of the new state in a simulated system may be known or accurately estimated, the actual location of the new state in a physical system will be uncertain, and so the estimate of value associated with the new state may be inaccurate. Some embodiments define an area of uncertainty in state space around the new state and estimate the value at multiple points across the area of uncertainty. By taking the lowest of such values as the value associated with the new state, these embodiments may help ensure that a robust estimate of value is used for training the control policy.

Figure 3:
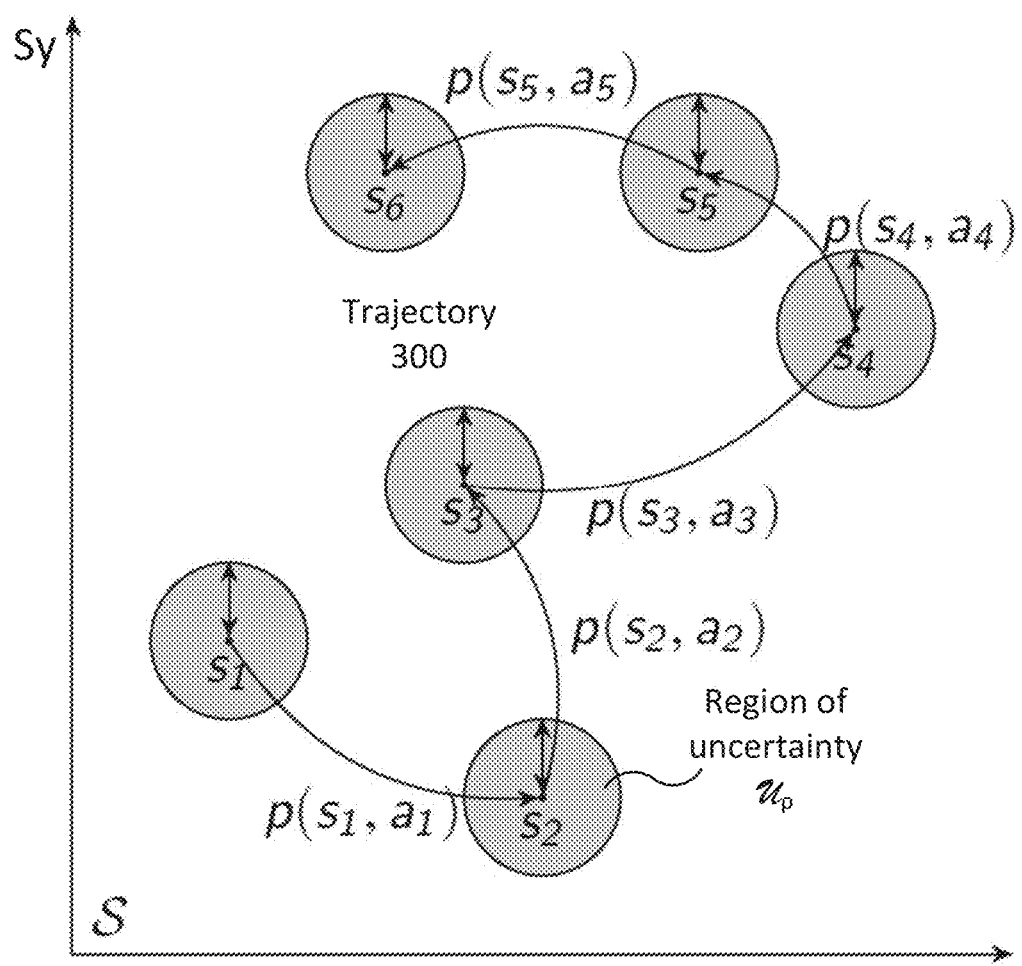
FIG. 3 illustrates a state transition trajectory of a dynamic system according to some embodiments.

FIG. 3 illustrates a trajectory 300 of state transitions and associated uncertainty in a state space S. The state space S shown in FIG. 3 is two dimensional, i.e., it is defined by two state variables associated with the simulated system, for ease of understanding. However, it will be appreciated that in general the state space S may be n-dimensional as it may be defined by n different states. Each state, $s_1$, $s_2$, $s_3$, etc. illustrated in the trajectory 300 as a point in state space defined by the state variables (Sx,Sy). As illustrated in FIG. 3, the state of the system transitions sequentially from one state to the next, e.g. from state $S_1$ to state $S_2$, when an action, e.g., a1, is taken on the system. When a transition from one state to the next occurs, the simulation may result in a transition of the system state to a defined point in state space, e.g., state $S_2$. However, as noted above, because of the probabilistic nature of the transition in a real system, some embodiments define a region of uncertainty $U_p$ around the state $S_2$. Rather than evaluating the value function at the single point $S_2$, some embodiments estimate a minimum value of the value function over the entire region of uncertainty and assign the estimated minimum value as the value associated with the point $S_2$.

Robust Bellman Equation

Methods of using the Bellman Equation to estimate value functions are dependent on having a reliable way of sampling interactions between the control system and the environment. Since this is usually not the case, most agents are instead trained in simulators. However, this approach may introduce generalization issues, since the simulator and the real environment will always be different due to modelling assumptions and errors. That is, the state of a simulated system or environment is typically modeled by a finite number of state variables, while in a real system, the number of variables that potentially affect the state of the system may be infinite.

For ease of understanding and visualization, an example of controlling a complex physical system will be described in the context of controlling the state of a quadcopter, or four rotor helicopter. However, it will be appreciated that the concepts illustrated in the example of a quadcopter are applicable to the control of other types of complex physical systems, such as wireless communication networks, which can be characterized by states that are affected by system inputs and that have associated rewards and value functions.

For example, the state of a simulated quadcopter may be represented by a state vector ($s_1$, $s_2$) including two state elements, e.g., position ($s_1$) and velocity ($s_2$). The state of a real quadcopter may include many other state elements that affect the operation of the quadcopter, such as temperature, humidity, air pressure, wind speed, battery level, friction losses, etc. A simulated action taken on a simulated quadcopter, such as increasing a level of voltage applied to a motor, will result in a predictable result based on the current state of the quadcopter and the action applied to it. In a real quadcopter, however, the same action may have a randomized outcome depending on the other state variables that are not accounted for in the simulation.

Some embodiments provide methods of dealing with model misspecifications through the use of Robust Bellman equations. In this setting, the environment model is not treated as a point estimate of a state but instead as a set of possible models called an uncertainty set. The Robust Bellman equation below is defined as the expected cumulative reward for an agent given the worst possible model in the uncertainty set. This addition makes this estimation more resilient to modelling errors. The robust Bellman Equation may be expressed as:

$$V^\pi(s_t) = \min_{p \in P} E_{p,\pi}[r(s_t, a_t) + \gamma V^\pi(s_{t+1})] \qquad [2]$$

where r(s,a) is reward at state s and action a, $V^\pi(s)$ is a value returned through a value function estimator, and P is an uncertainty set of state transition probabilities. That is, the value function at state $s_t$ is defined as the minimum expected value over a set of possible state transitions.

Although deep reinforcement learning models have performed well in simulated environments, it is difficult to guarantee a level of performance after the model is transferred to a real environment. This is because of the gap between the simulation setup where the agent is trained and the real environment where the agent is implemented. In order to transfer the model successfully, the training algorithm needs to handle such gaps. For example, some embodiments may be used to train control systems for unmanned vehicles, such as driverless cars, quadcopter drones, etc. In the quadcopter scenario, a simulator may compute a state, such as a geographical position of the quadcopter, using physical models such as aerodynamics, etc., when the parameters of the motors are given as an input to the simulator.

Note that in this context, 'transfer' means that an RL agent which was trained in a simulation environment is moved to the real application for the deployment purpose as it is. For example, once an RL agent for a quadcopter control whose input is geographical information and action output is a speed vector for four motors is trained in the simulation, the agent can be transferred to the real quadcopter while keeping same structure of input/output (i.e., geographical information and a speed vector for four motors in reality, respectively), and the same model parameters.

Robust reinforcement learning is one method that can enable Sim-to-Real transfer, because it trains an agent in a simulation to cover uncertain scenarios represented by state transition probabilities (e.g., simulation setup, dynamics in the environment), which in turn fills in the gap between simulations and reality. The typical way of building a simulator for 'Sim-to-Real transfer' is that, given the role of RL agent in reality (i.e., input and output of the agent are observation and action, respectively), the simulator builds relevant physical models to the reality that emulate the dynamics of observations (i.e., input of the agent) and reward for a given action (i.e., output of the agent) in the environment.

In previous approaches, it was not clear how to implement the algorithm in conjunction with deep reinforcement learning algorithms. Some embodiments described herein provide an approach to implement a robust Bellman Equation in an existing policy optimization RL algorithm, such as PPO, A3C, etc.

In particular, some embodiments provide a computationally efficient method for implementing a robust RL algorithm by approximating the Robust Bellman equation. More specifically, some embodiments generate an approximated target value $$\left(\text{i.e., } \min_{p \in P} E_{p,\pi}[r(s_t, a_t) + \gamma V^\pi(s_{t+1})]\right)$$

of the robust value function estimator (which may be, for example, a neural network). In particular, some embodiments may enable faster computation of a robust Bellman Equation with lower variance compared to other methods (e.g., Monte Carlo sampling), and easy implementation by incorporating open source tools of backpropagation.

With the state-of-the art RL solutions, Sim-to-Real transfer would fail because RL agents trained in the simulation will work only for the case where the physical system is identical to the simulated system. However, such equality between the simulation and real environment is almost impossible to achieve. Compared to prior RL solutions, a robust reinforcement learning approach according to some embodiments may enable practical Sim-to-Real transfer by training an RL agent in a simulation to make it more robust to uncertainties in the environment. Accordingly, such an approach can more effectively handle a scenario where the reality is different to the simulation scenario.

In a quadcopter scenario where RL is used for automating the motor control, when a solution as described herein is applied with Sim-to-Real transfer framework, the agent may automate the control even if there exists a gap between simulation setup and reality (e.g., quadcopter mass). Thus, thanks to the success in Sim-to-Real transfer, RL training cost (i.e., cost for the simulation running) may be reduced compared to the existing RL training approaches, because the existing solutions require training in a real environment.

Some embodiments may provide a simpler way of approximating a robust Bellman Equation using existing tools made for the state of the art deep RL algorithms. Thus, the cost for code development and computational resource required for training can be reduced.

Figure 1:
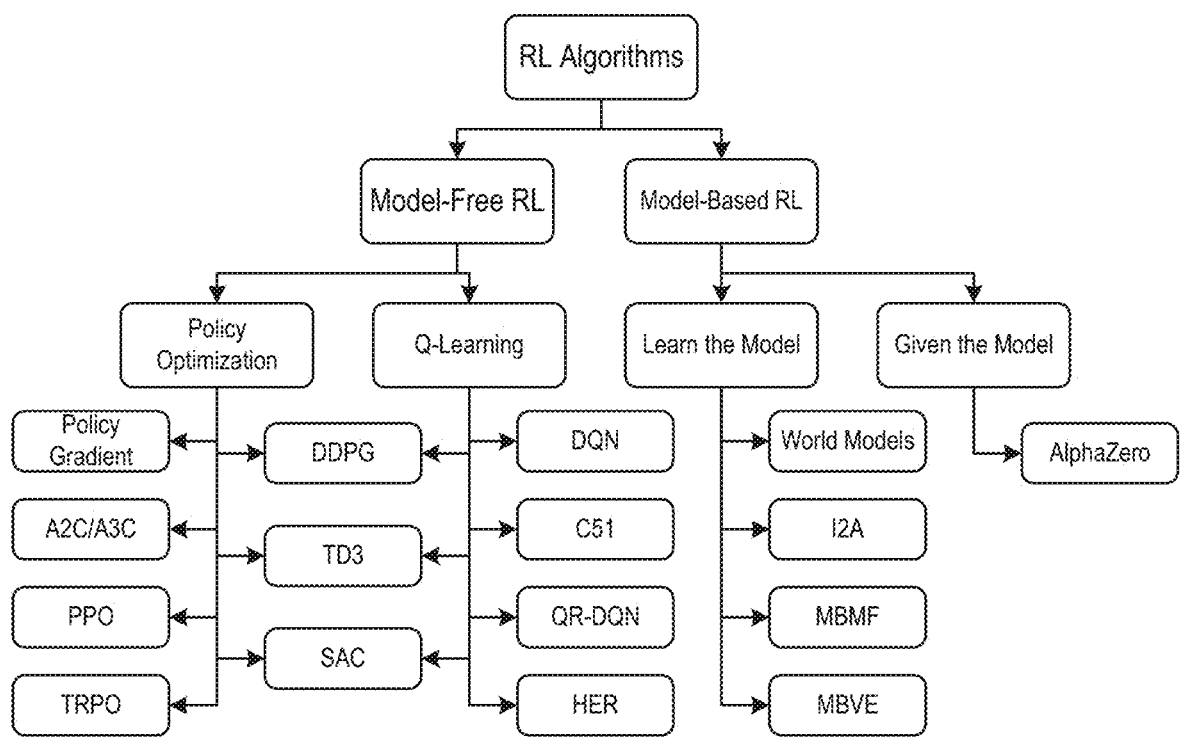
FIG. 1 illustrates a taxonomy of reinforcement learning algorithms.
Figure 4:
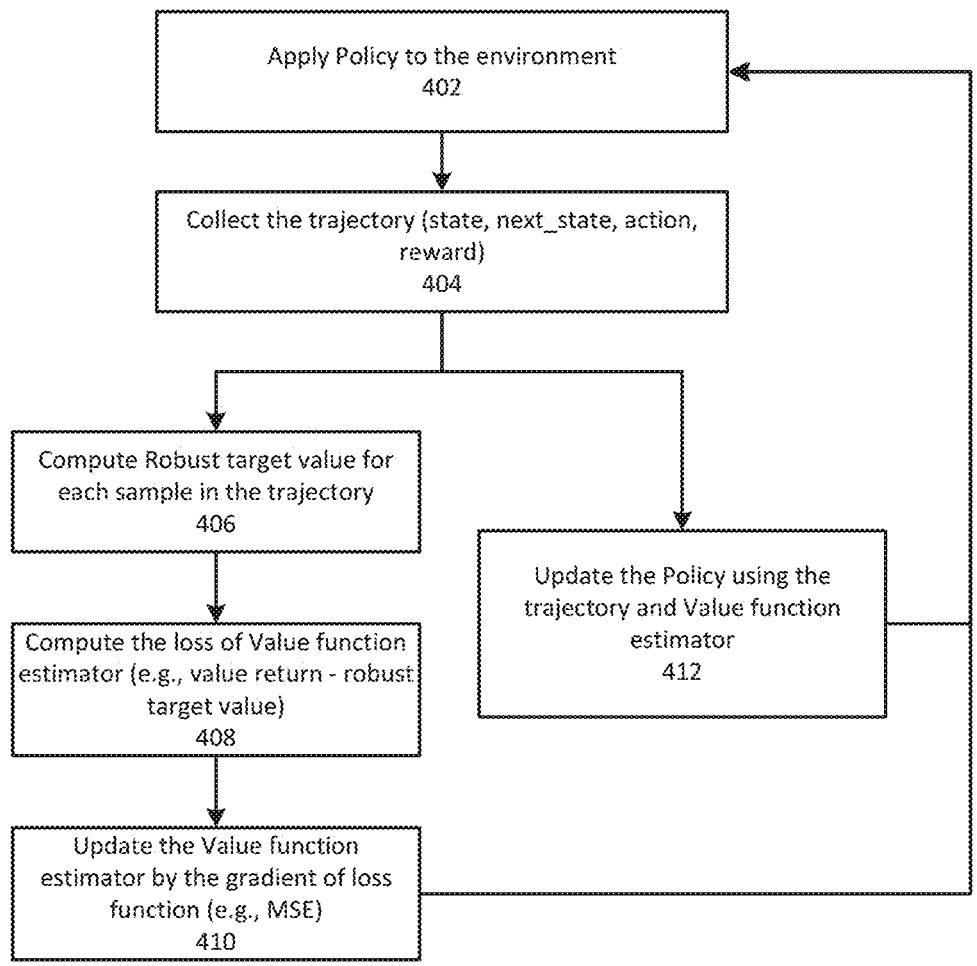
FIG. 4 illustrates operations of a policy training server according to some embodiments.

A procedure for training RL models by an agent, such as a policy training server 250, is depicted in FIG. 4. Some embodiments may employ an actor-critic approach (e.g., A2C, A3C, PPO) in a model-free and policy-optimization family as shown in FIG. 1, where a control policy (i.e., actor networks) and a value function estimator (e.g., a critic network) are trained and operate with each other to stabilize the training process. In the example quadcopter scenario, a control policy is a function approximator whose input is an observation of the environment (e.g., GPS position, velocity) and whose output is a vector of motor parameters (e.g., angular speed). A value function estimator is a function approximator whose input is an observation of the environment (e.g., GPS position, velocity) and whose output is an estimation of accumulated future rewards from the input observation. The definition of reward in the example scenario is the inverse distance to the target position. Some embodiments estimate a robust target value based on Robust bellman equation.

In FIG. 4, the first and second steps shown in blocks 402 and 404 correspond to collecting trajectory samples (state, next state, action and reward) by applying the learned control policy in the simulation environment. In particular, at block 402, the agent applies the policy to the environment by executing an action according to the policy. At block 404, the agent collects a trajectory sample including the current state, the next state following the action, the action and the reward associated with the action.

At blocks 406-410 and 412, the agent may run a policy update and a value function estimator update in parallel using trajectory samples collected from previous steps. It will be appreciated, however, that the policy update and the value function estimator update procedures may be performed sequentially rather than in parallel.

The value function update procedure (blocks 406-410) includes the following operations. At block 406, the agent computes a robust target value using collected samples and the value function estimator. At block 408, the agent computes a loss of value function estimator. At block 410, the agent updates the value function estimator, for example, via backpropagation with loss function, which is a method of training a neural network. In the computation of a robust target value, the methods adds robustness in the target value via a robust Bellman Equation as follows:

$$V^\pi(s_t) = \min_{p \in P} E_{p,\pi}[r(s_t, a_t) + \gamma V^\pi(s_{t+1})] \quad [3]$$

where r(s,a) is reward at state s and action a, $V^\pi(s)$ is a value return through value function estimator, P is an uncertainty set of transition probabilities, and y is a future discount factor.

The robust target value block 406 is the right-hand side in the equation above. The added difficulty compared to the regular Bellman equation comes from the minimization over the uncertainty set P of transition possibilities, resulting in the inner problem:

$$\min_{p \in P} E_{p,\pi}[V^\pi(s_{t+1}) | s_t] \quad [4]$$

Once the agent collects trajectory (state, action, reward, next_state) samples (i.e., $(s_t, a_t, r_t, s_{t+1})$) from the environment, the agent computes the robust target value as follows:

$$\text{Robust target value} = r_t + \min_{u \in \mathcal{U}_\rho} V^\pi(s_{t+1} + u) \quad [5]$$

where $\mathcal{U}_\rho$ (the uncertainty region) is a set of vectors in state space in a region centered around the new state $s_{t+1}$. In some embodiments, the uncertainty region $\mathcal{U}_\rho$ may be selected as a region whose $L_2$ norm is less or equal to a predetermined radius ρ (i.e., $\mathcal{U}_\rho = \{u \in \mathbb{R}^{|S|}, |u|_2 \leq \rho\}$). In a two dimensional state space, the uncertainty region is defined by a circle of radius ρ. In a three dimensional state space, the uncertainty region is defined by a sphere of radius ρ, etc.

Intuitively speaking, the robust target value is a pessimistic estimation of an accumulated future reward by taking the minimum return of the value function estimator ($V^\pi$) over all candidate states whose distance to the observed next state $s_{t+1}$ is within a distance of ρ in state space.

Figure 5A:
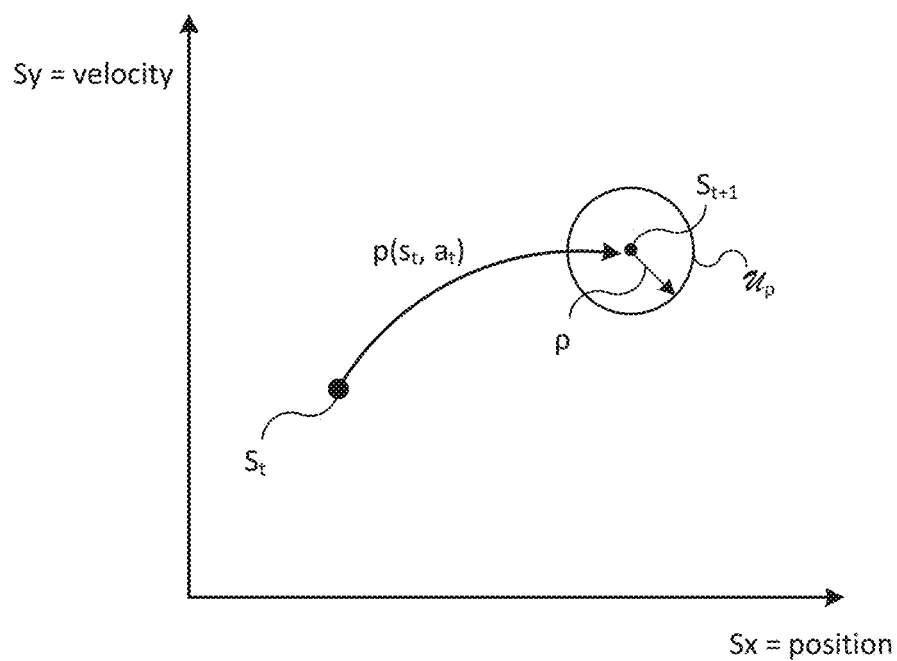
FIGS. 5A and 5B illustrate estimation of a value function according to some embodiments.
Figure 5B:
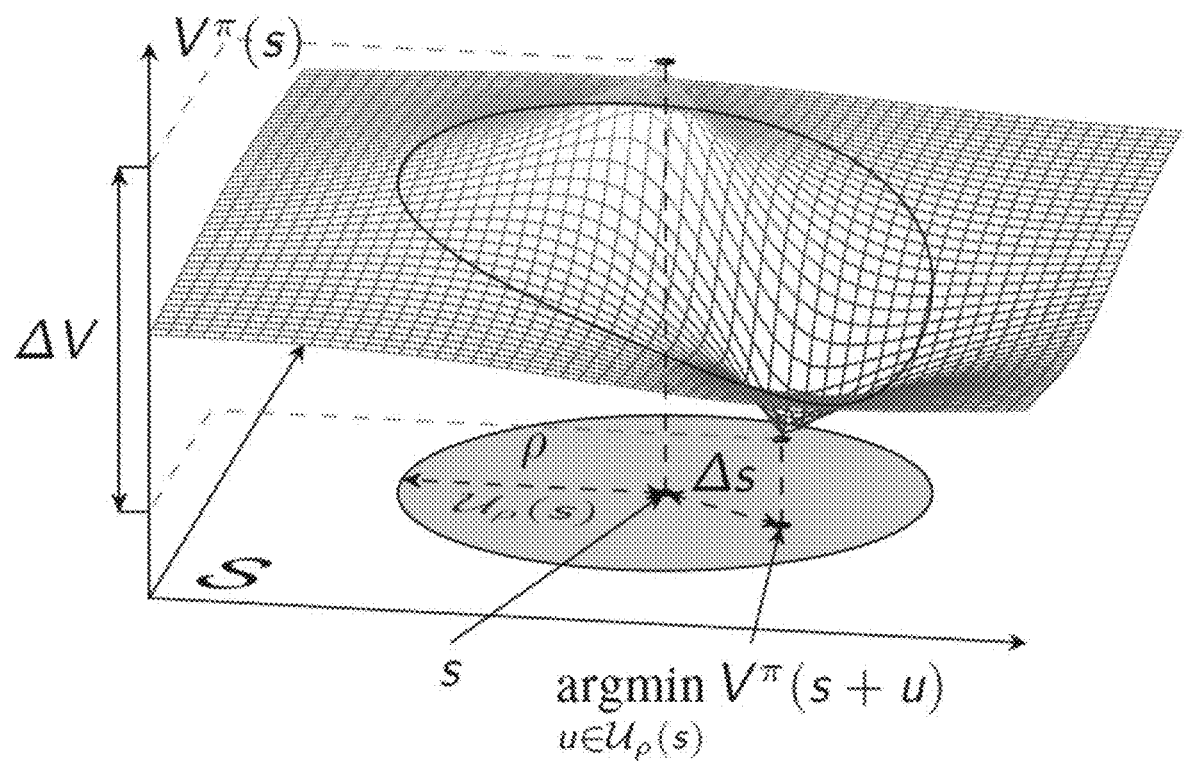

Referring to FIGS. 5A and 5B, a quadcopter scenario where the state $s_t$ is an observation vector at time step t (e.g., Sx=position and Sy=velocity) of the quadcopter and $s_{t+1}$ is the observed next state (e.g., geographical position and velocity) after an action $a_t$ on the motors parameters is taken is illustrated. That is, FIG. 5A illustrates a two-dimensional state space defined by Sx=position and Sy=velocity. An action a causes a transition from a current state $s_t$ to a new state $s_{t+1}$.

Some embodiments build a set of potential next states whose position and velocity is close to the observed next state $s_{t+1}$ (i.e., $\{s_{t+1}+u|u \in \mathcal{U}_\rho\}$) based on uncertain transition dynamics between states, rather than considering only $s_{t+1}$ in the target value computation. This lets the quadcopter agent be ready for any uncertain state dynamics (e.g., due to mass change, or wind) which in turn feeds robustness to the agent.

An example of target value calculation is illustrated in FIG. 5B. Instead of evaluating the value function $V^\pi(s)$ only at $s_{t+1}$, the function is evaluated at a plurality of locations within the uncertainty region $\mathcal{U}_\rho$. The shape of the value function $V^\pi(s)$ is explored within the uncertainty region $\mathcal{U}_\rho$ using, for example, a gradient descent technique, to estimate a minimum value of the value function within the uncertainty region $\mathcal{U}_\rho$ at point s+Δs, and the estimated minimum value is used as the value associated with $s_{t+1}$ to provide a pessimistic value estimate.

An algorithm for computing $$\min_{u \in \mathcal{U}_\rho} V^\pi(s_{t+1} + u)$$

is illustrated in FIG. 6. In particular, the algorithm shown in FIG. 6 may decrease the risk of finding a local minimum by considering multiple gradient step iterations in parallel. First, k points are initialized inside the region of uncertainty (i.e., $\{s_{t+1}+u | u \in \mathcal{U}_\epsilon\}$). The algorithm takes n gradient steps for each point. If at any time the step reaches outside the region of uncertainty it is renormalized into the region of uncertainty. After n iterations, the minimum of the k points is taken as the solution to the inner problem.

In line 6 of the algorithm, the gradient with respect to the input state 'x' to the value function estimator is computed. The computation of line 6 can be implemented by using a backpropagation tool in either Tensorflow or Pytorch. In line 7, u is updated by adding the gradient g to itself. In line 8, if $L_2$-norm of the updated u becomes greater than the given distance ρ, u is adjusted for being projected inside region $\mathcal{U}_\rho$.

A potential benefit to this approach is that no additional requirements may be placed on the simulator in order to handle the modifications. The method places an additional step in the training procedure, meaning that the method is highly flexible and applicable to multiple already existing algorithms.

From a theoretical standpoint, the first simplification to the inner minimization problem $$\left(\text{i.e., } \min_{p \in P} E_{p,\pi}[V^\pi(s_{t+1}) | s_t]\right)$$

a deterministic system, which makes the expected value trivial. The uncertainty set is then instead parameterized by a set of possible next states. This may be simplified further to assume that uncertainty is expressed as an additive shift in the transitioned state where the size of the shift is bounded by a $L_2$ sphere with radius ρ:

$$\mathcal{U}_\rho = \{u \in \mathbb{R}^{|S|}, |u|_2 \leq \rho\} \quad [6]$$

where S is the dimensionality of the features of the states. The inner problem now reduces to:

$$\min_{u \in \mathcal{U}_\rho} V^\pi(s_{t+1} + u) \quad [7]$$

Under the assumption that $V^\pi$ is a differentiable structure, often an Artificial Neural Network, the minimization problem can now be approximated using first order methods utilizing gradient step algorithms using the gradient of the objective function. Such methods do not handle the constraints imposed by $\mathcal{U}_\rho$, but due to the region's simplicity it is easy to check for constraint violations and renormalize the solution into the region.

An illustrative case for the methods described herein is in the task of positional control of a quadcopter, where a closed loop control policy capable making the quadcopter track a point in 3D space is sought. The control input is the current state of the system. Based on the control policy, the control system produces control inputs which cause the system to transition into a new state. The physics of the system can be described using three position states (x, y, z), three rotational states (roll, pitch, yaw), and their respective time derivatives (three positional velocities and three angular velocities), which concatenated together gives a 12-dimensional state of the full system. The actions are controlling the voltage to the four motors on the quadcopter, which in turn can control the position of the quadcopter and exerting a lift force from given pose in order to control the position of the quadcopter.

Additionally, an RL agent also requires a reward signal from the environment providing feedback on how desirable the current state of the system is. The goal of RL agents is to maximize the expected cumulative rewards given by the environment. For the quadcopter case, the reward is based on the Euclidian distance between the current position of the quadcopter and the desired position, which should be as low as possible when the controller can track the desired position. The reward is defined as the negative exponential of the Euclidian distance, such that the maximum reward of 1 is received when the distance is zero and the minimum reward of 0 is received when the distance goes to infinity.

Figure 7:
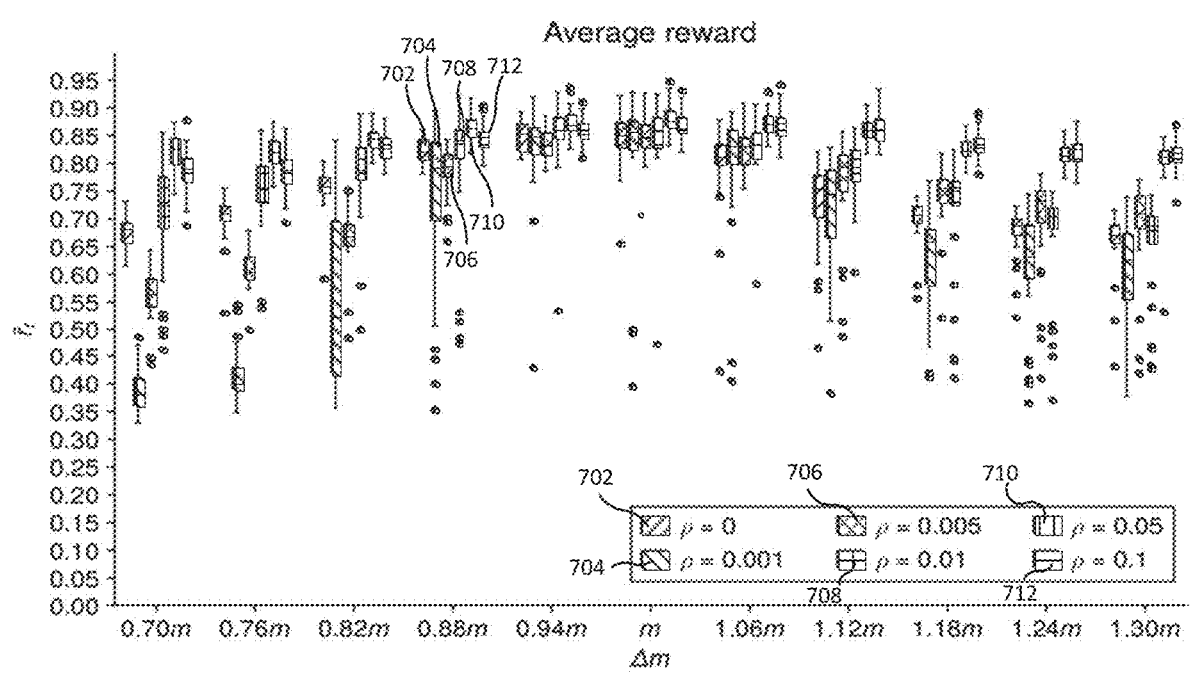
FIG. 7 illustrates an example of application of a control policy trained in accordance with some embodiments.

FIG. 7 illustrates example results from an evaluation of the methods described herein. The specific task in this example is to learn a policy for positional control of a quadcopter, i.e. making the quadcopter tracking a point in 3D space. A set of agents with differing level of robustness, controlled by the parameter p, are trained in a simulated version of the problem until convergence. The agents are then tested on versions of the simulator but with different quadcopter mass in the mathematical model in order to create a mismatch between the training and target environments. The horizontal axis in FIG. 7 shows the difference in mass from the training environment with the performance of the agents in each environment grouped together around each tick on the axis. The vertical axis represents the performance of the agents in average reward per time step, where the reward is determined by the distance to the wanted position of the quadcopter and higher is better. The different agents range from regular PPO (blue color 702, ρ=0) to a fairly high robustness (purple color 712, ρ=0.1). The results show an increased resilience against model mismatch for the more robust agents.

Figure 8:
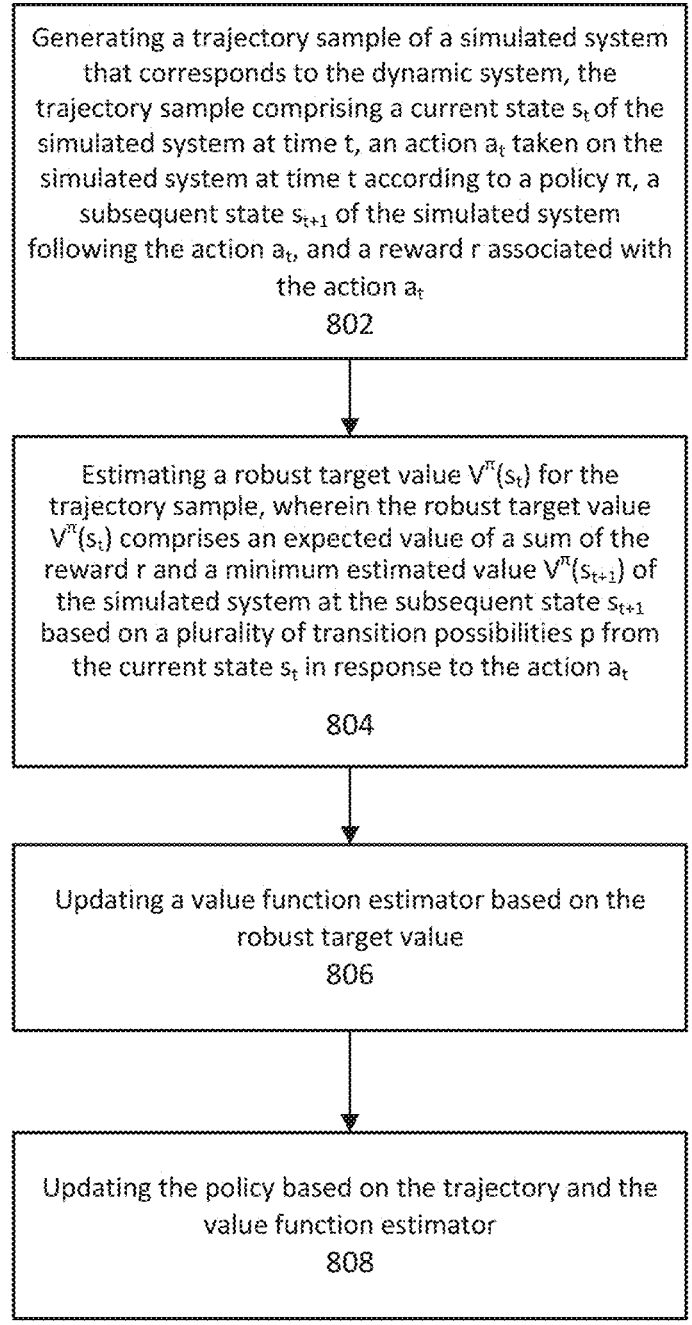
FIG. 8 illustrates operations of a policy training server according to some embodiments.

FIG. 8 illustrates operations of a policy training server 250 according to some embodiments of the inventive concepts. As shown therein, a computer implemented method of training a reinforcement learning model for controlling a dynamic system includes generating (block 802) a trajectory sample of a simulated system that corresponds to the dynamic system, the trajectory sample comprising a current state $s_t$ of the simulated system at time t, an action $a_t$ taken on the simulated system at time t according to a policy π, a subsequent state $s_{t+1}$ of the simulated system following the action $a_t$, and a reward r associated with the action $a_t$, estimating (block 804) a robust target value $V^\pi(s_t)$ for the trajectory sample, wherein the robust target value $V^\pi(s_t)$ is an expected value of a sum of the reward r and a minimum estimated value $V^\pi(s_{t+1})$ of the simulated system at the subsequent state $s_{t+1}$ based on a plurality of transition possibilities p from the current state $s_t$ in response to the action $a_t$, updating (block 806) a value function estimator based on the robust target value, and updating (block 808) the policy based on the trajectory and the value function estimator.

Generating the trajectory sample may include estimating the current state $s_t$ at time t of the simulated system that corresponds to the dynamic system, simulating the action $a_t$ on the simulated system based on the current state $s_t$ according to the policy $\pi$, sampling the subsequent state $s_{t+1}$ at time t+1 of the simulated system following the action $a_t$, and estimating the reward r associated with the action $a_t$.

The method may further include generating the minimum estimated value $V^{\pi}(s_{t+1})$ of the simulated system at the subsequent state $s_{t+1}$ by estimating the value function at each of a plurality of target states near the subsequent state $s_{t+1}$ and selecting a minimum value of the value function at each of the plurality of target states.

Each of the plurality of target states may be within a predefined distance from the subsequent state $s_{t+1}$.

The plurality of target states may be selected from within a defined region of a state space containing the subsequent state $s_{t+1}$, and the method may further include performing a gradient search of the value function within the defined region to find the minimum estimated value $V^{\pi}(s_{t+1})$.

The defined region of the state space may include an $L_2$ sphere $U_\rho(s_{t+1})$ within the state space centered on the subsequent state $s_{t+1}$ and having a radius $\rho$.

Performing the gradient search may include calculating a gradient of the value function with respect to the state s at each of the plurality of states within the defined state space, at each of the plurality of states within the defined state space, taking a step along the gradient to a new point within the state space, determining whether the new point is within the defined region of state space, in response to determining that the new point is outside the defined region of state space, normalizing the step so that the new point is within the defined region of state space, and estimating the value function at the new point.

The minimum estimated value $V^{\pi}(s_{t+1})$ of the dynamic system may be a discounted future value.

The method may further include providing the policy to a system controller for controlling the dynamic system using the updated policy.

Figure 9:
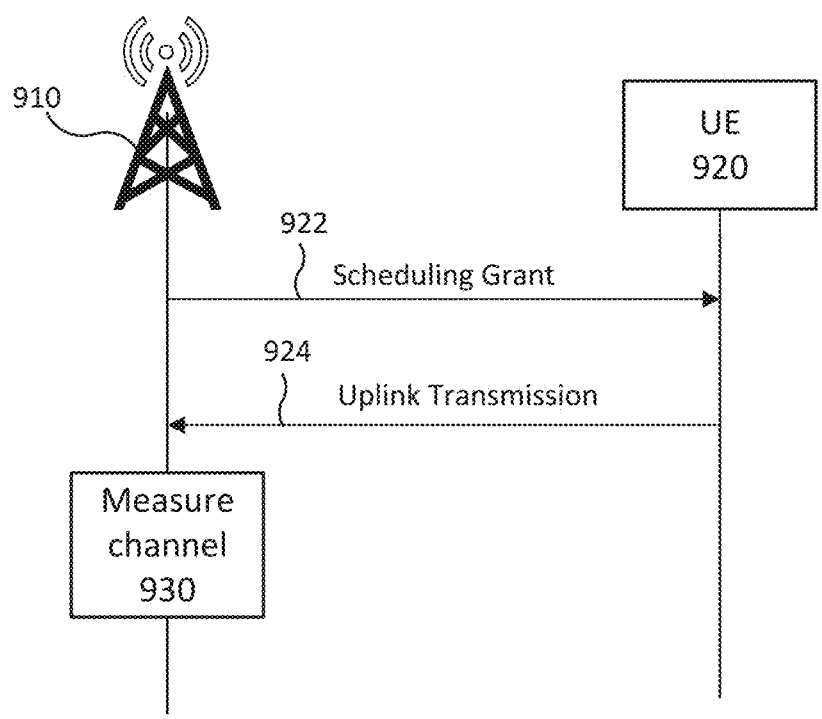
FIGS. 9 and 10 illustrate elements of a wireless communication system that can implement a control policy trained in accordance with some embodiments.

FIG. 9 illustrates an example of a wireless communication system in which a system controller can utilize a policy that is trained according to some embodiments. In particular, in some embodiments, the system includes a wireless base station 910 and a user equipment (UE) 920 that is served by the base station 910. In a wireless communication system, the base station 910 may control access by the UE 920 to an uplink radio channel by means of scheduling grants. A scheduling grant is a message transmitted to the UE on a downlink control channel that specifies uplink resources that the UE 920 can use to transmit uplink data to the base station 910. As shown in FIG. 9, the base station 910 transmits a scheduling grant 922 to the UE, and the UE responsively transmits uplink data 924 using resources assigned to the UE in the scheduling grant. The base station 910 may collect state information about the network before or after the scheduling grant and uplink transmission by, for example, measuring a performance metric associated with the network, such as a quality metric associated with the uplink channel, such as signal to noise ratio, bit error rate, etc.

To achieve various performance goals, such as optimizing the use of system resources, avoiding interference, maximizing throughput, etc., the assignment of uplink resources may involve a complex evaluation of many system performance factors.

Accordingly, in some embodiments, the dynamic system may include a wireless communication system. The state of the dynamic system may include a performance metric of the wireless communication system, and the action may include an uplink resource scheduling grant that allocates uplink transmission resources to a wireless terminal served by the wireless communication system. The base station may control the uplink resource allocation using a control policy that is trained through reinforcement learning as described herein.

Figure 10:
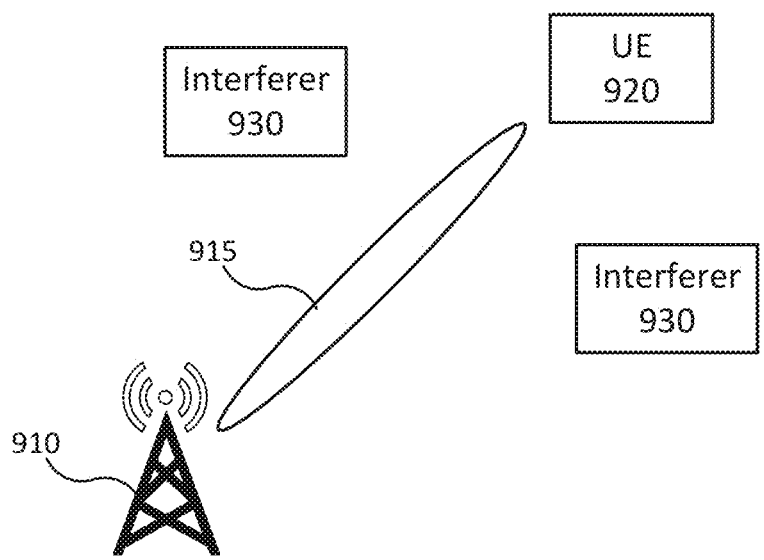

FIG. 10 illustrates a further example of a wireless communication system in which a system controller can utilize a policy that is trained according to some embodiments. In particular, in some embodiments, the system includes a wireless base station 910 and a user equipment (UE) 920 that is served by the base station 910. In a wireless communication system, the base station 910 may use active beamforming to form a beam 915 to the UE 920, or vice versa, for use in transmitting/receiving signals to/from the UE 920. Active beamforming involves selection of a plurality of beamforming weights that cause an antenna beam to be selectively formed in a desired direction. The selection of beamforming weights may take into account a number of parameters, such as the location of the desired user and the locations of undesired users, such as the potential interferers 930 shown in FIG. 10. The selection of beamforming weights may take into account many other parameters, such as the transmission power of the desired user and/or the interferers, the channel state, received signal measurements, and other factors.

Accordingly, in some embodiments, the dynamic system includes a wireless communication system, the state of the dynamic system includes a parameter of the wireless communication system, and the action includes generation of a set of beamforming weights used to form a beam from a transceiver in the wireless communication system. The base station may generate a set of beamforming weights and use the generated beamforming weights to form a beam to a desired user according to a control policy that is trained through reinforcement learning as described herein.

Example Embodiments

Embodiment 1. A computer implemented method of training a reinforcement learning model for controlling a dynamic system, comprising:

generating (802) a trajectory sample of a simulated system that corresponds to the dynamic system, the trajectory sample comprising a current state $s_t$ of the simulated system at time t, an action $a_t$ taken on the simulated system at time t according to a policy $\pi$, a subsequent state $s_{t+1}$ of the simulated system following the action $a_t$, and a reward r associated with the action at;

estimating (804) a robust target value $V^{\pi}(s_t)$ for the trajectory sample, wherein the robust target value $V^{\pi}(s_t)$ comprises an expected value of a sum of the reward r and a minimum estimated value $V^{\pi}(s_{t+1})$ of the simulated system at the subsequent state $s_{t+1}$ based on a plurality of transition possibilities p from the current state $s_t$ in response to the action $a_t$;

updating (806) a value function estimator based on the robust target value; and updating (808) the policy based on the trajectory and the value function estimator.

Embodiment 2. The method of Embodiment 1, wherein generating the trajectory sample comprises:

estimating the current state $s_t$ at time t of the simulated system that corresponds to the dynamic system;

simulating the action $a_t$ on the simulated system based on the current state $s_t$ according to the policy π;

sampling the subsequent state $s_{t+1}$ at time t+1 of the simulated system following the action $a_t$; and estimating the reward r associated with the action $a_t$.

Embodiment 3. The method of any previous Embodiment, further comprising generating the minimum estimated value $V^π(s_{t+1})$ of the simulated system at the subsequent state $s_{t+1}$ by estimating the value function at each of a plurality of target states near the subsequent state $s_{t+1}$ and selecting a minimum value of the value function at each of the plurality of target states.

Embodiment 4. The method of Embodiment 3, wherein each of the plurality of target states is within a predefined distance from the subsequent state $s_{t+1}$.

Embodiment 5. The method of Embodiment 3, wherein the plurality of target states are selected from within a defined region of a state space containing the subsequent state $s_{t+1}$, the method further comprising:

performing a gradient search of the value function within the defined region to find the minimum estimated value $V^π(s_{t+1})$.

Embodiment 6. The method of Embodiment 5, wherein the defined region of the state space comprises an $L_2$ sphere $U_ρ(s_{t+1})$ within the state space centered on the subsequent state $s_{t+1}$ and having a radius ρ.

Embodiment 7. The method of Embodiment 5, wherein performing the gradient search comprises:

calculating a gradient of the value function with respect to the state s at each of the plurality of states within the defined state space;

taking a step along the gradient to a new point within the state space;

determining whether the new point is within the defined region of state space;

in response to determining that the new point is outside the defined region of state space, normalizing the step so that the new point is within the defined region of state space; and estimating the value function at the new point.

Embodiment 8. The method of any previous Embodiment, wherein the minimum estimated value $V^π(s_{t+1})$ of the dynamic system is a discounted future value.

Embodiment 9. The method of any previous Embodiment, further comprising:

providing the policy to a system controller for controlling the dynamic system using the updated policy.

Embodiment 10. The method of Embodiment 9, wherein the dynamic system comprises a wireless communication system, wherein the state of the dynamic system comprises a performance metric of the wireless communication system, and wherein the action comprises an uplink resource scheduling grant that allocates uplink transmission resources to a wireless terminal served by the wireless communication system.

Embodiment 11. The method of Embodiment 9, wherein the dynamic system comprises a wireless communication system, wherein the state of the dynamic system comprises a performance metric of the wireless communication system, and wherein the action comprises generation of a set of beamforming weights used to form a beam from a transceiver in the wireless communication system.

Embodiment 12. A policy training server (250), comprising:

a processing circuit (253); and a memory (255) coupled to the processing circuit and comprising computer readable program instructions that, when executed by the processing circuit, cause the policy training server to perform operations according to any of embodiments 1 to 12.

Embodiment 13. A policy training server (250) comprising:

a trajectory generation module (274) for generating (802) a trajectory sample of a simulated system that corresponds to a dynamic system, the trajectory sample comprising a current state $s_t$ of the simulated system at time t, an action $a_t$ taken on the simulated system at time t according to a policy π, a subsequent state $s_{t+1}$ of the simulated system following the action $a_t$, and a reward r associated with the action $a_t$;

a target value estimation module (276) for estimating (804) a robust target value $V^π(s_t)$ for the trajectory sample, wherein the robust target value $V^π(s_t)$ comprises an expected value of a sum of the reward r and a minimum estimated value $V^π(s_{t+1})$ of the simulated system at the subsequent state $s_{t+1}$ based on a plurality of transition possibilities p from the current state $s_t$ in response to the action at;

a value function updating module (276) for updating (806) a value function estimator based on the robust target value; and a policy updating module (272) for updating (808) the policy based on the trajectory and the value function estimator.

Embodiment 14. A computer implemented method of training a reinforcement learning model for controlling a wireless communication system, comprising:

generating (802) a trajectory sample of a simulated system that corresponds to the wireless communication system, the trajectory sample comprising a current state $s_t$ of the simulated system at time t, an action $a_t$ taken on the simulated system at time t according to a policy π, a subsequent state $s_{t+1}$ of the simulated system following the action $a_t$, and a reward r associated with the action at;

estimating (804) a robust target value $V^π(s_t)$ for the trajectory sample, wherein the robust target value $V^π(s_t)$ comprises an expected value of a sum of the reward r and a minimum estimated value $V^π(s_{t+1})$ of the simulated system at the subsequent state $s_{t+1}$ based on a plurality of transition possibilities p from the current state $s_t$ in response to the action $a_t$;

updating (806) a value function estimator based on the robust target value; and updating (808) the policy based on the trajectory and the value function estimator.

Embodiment 15. The method of Embodiment 14, wherein generating the trajectory sample comprises:

estimating the current state $s_t$ at time t of the simulated system that corresponds to the wireless communication system;

simulating the action $a_t$ on the simulated system based on the current state $s_t$ according to the policy π;

sampling the subsequent state $s_{t+1}$ at time t+1 of the simulated system following the action $a_t$; and estimating the reward r associated with the action $a_t$.

Embodiment 16. The method of Embodiment 14 or 15, further comprising generating the minimum estimated value $V^π(s_{t+1})$ of the simulated system at the subsequent state $s_{t+1}$ by estimating the value function at each of a plurality of target states near the subsequent state $s_{t+1}$ and selecting a minimum value of the value function at each of the plurality of target states.

Embodiment 17. The method of Embodiment 16, wherein each of the plurality of target states is within a predefined distance from the subsequent state $s_{t+1}$.

Embodiment 18. The method of Embodiment 16, wherein the plurality of target states are selected from within a defined region of a state space containing the subsequent state $s_{t+1}$, the method further comprising:

performing a gradient search of the value function within the defined region to find the minimum estimated value $V^\pi(s_{t+1})$.

Embodiment 19. The method of Embodiment 18, wherein the defined region of the state space comprises an $L_2$ sphere $U_\rho(s_{t+1})$ within the state space centered on the subsequent state $s_{t+1}$ and having a radius $\rho$.

Embodiment 20. The method of Embodiment 18, wherein performing the gradient search comprises:

calculating a gradient of the value function with respect to the state s at each of the plurality of states within the defined state space;

at each of the plurality of states within the defined state space, taking a step along the gradient to a new point within the state space;

determining whether the new point is within the defined region of state space;

in response to determining that the new point is outside the defined region of state space, normalizing the step so that the new point is within the defined region of state space; and estimating the value function at the new point.

Embodiment 21. The method of any of Embodiments 14 to 20, wherein the minimum estimated value $V^\pi(s_{t+1})$ of the wireless communication system is a discounted future value.

Embodiment 22. The method of any of Embodiments 14 to 21, further comprising:

providing the policy to a system controller for controlling the wireless communication system using the updated policy.

Embodiment 23. The method of Embodiment 22, wherein the state of the wireless communication system comprises a channel measurement of the wireless communication system, and wherein the action comprises an uplink resource scheduling grant that allocates uplink transmission resources to a wireless terminal served by the wireless communication system.

Embodiment 24. The method of Embodiment 22, wherein the state of the wireless communication system comprises a channel measurement of the wireless communication system, and wherein the action comprises generation of a set of beamforming weights used to form a beam from a transceiver in the wireless communication system.

Embodiment 25. A policy training server (250), comprising:

a processing circuit (253); and a memory (255) coupled to the processing circuit and comprising computer readable program instructions that, when executed by the processing circuit, cause the policy training server to perform operations according to any of embodiments 14 to 24.

Embodiment 26. A policy training server (250) comprising:

a trajectory generation module (274) for generating (802) a trajectory sample of a simulated system that corresponds to a wireless communication system, the trajectory sample comprising a current state $s_t$ of the simulated system at time t, an action $a_t$ taken on the simulated system at time t according to a policy $\pi$, a subsequent state $s_{t+1}$ of the simulated system following the action $a_t$, and a reward r associated with the action $a_t$;

a target value estimation module (276) for estimating (804) a robust target value $V^\pi(s_t)$ for the trajectory sample, wherein the robust target value $V^\pi(s_t)$ comprises an expected value of a sum of the reward r and a minimum estimated value $V^\pi(s_{t+1})$ of the simulated system at the subsequent state $s_{t+1}$ based on a plurality of transition possibilities p from the current state $s_t$ in response to the action at;

a value function updating module (276) for updating (806) a value function estimator based on the robust target value; and a policy updating module (272) for updating (808) the policy based on the trajectory and the value function estimator.

Explanations are provided below for abbreviations that are mentioned in the present disclosure.

Abbreviation Explanation

RL Reinforcement Learning
RRL Robust Reinforcement Learning
PPO Proximal Policy Optimization
A3C Asynchronous Advantage Actor Critic Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional Explanation is Provided Below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
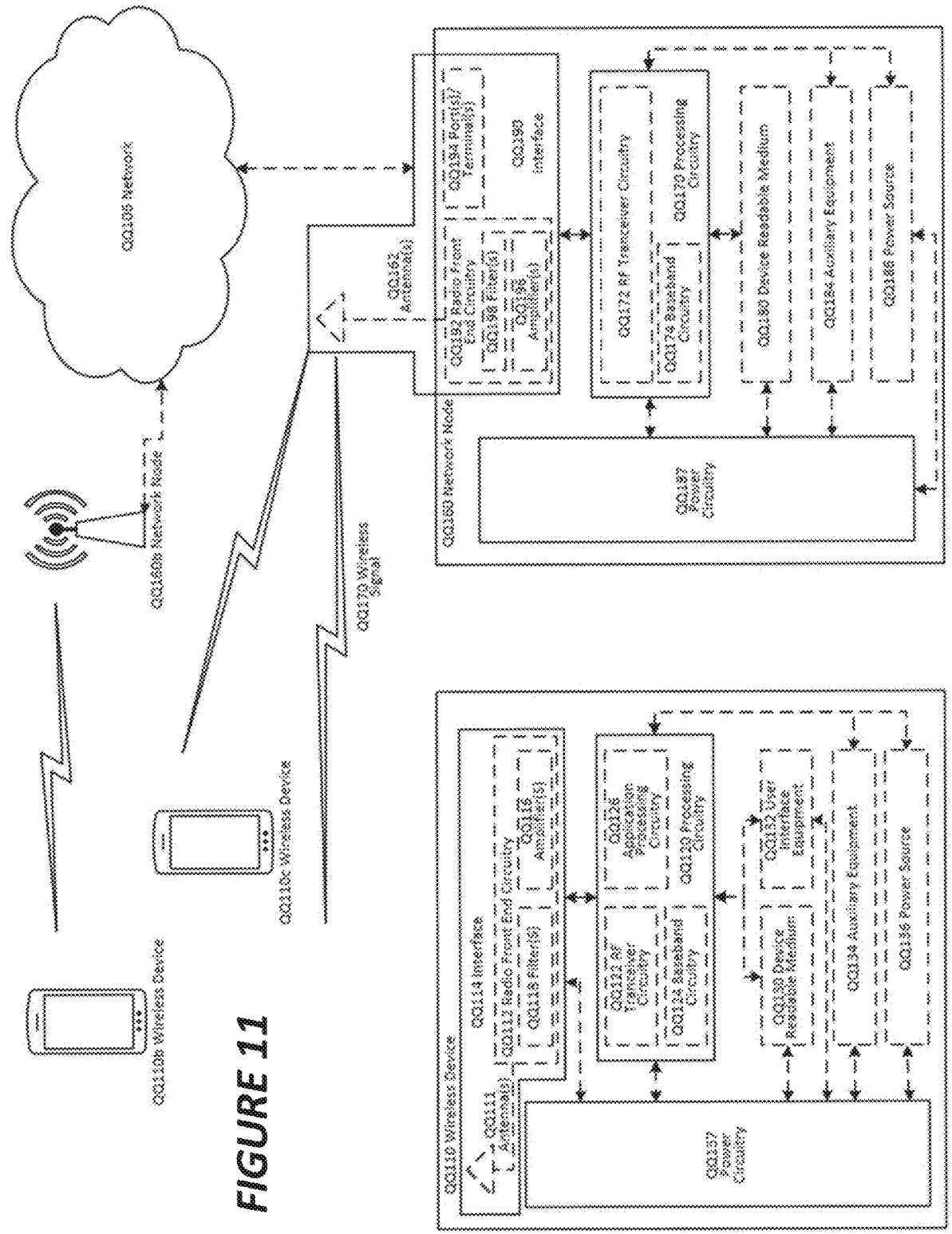
FIG. 11 is a block diagram of a wireless network in accordance with some embodiments.

FIG. 11: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
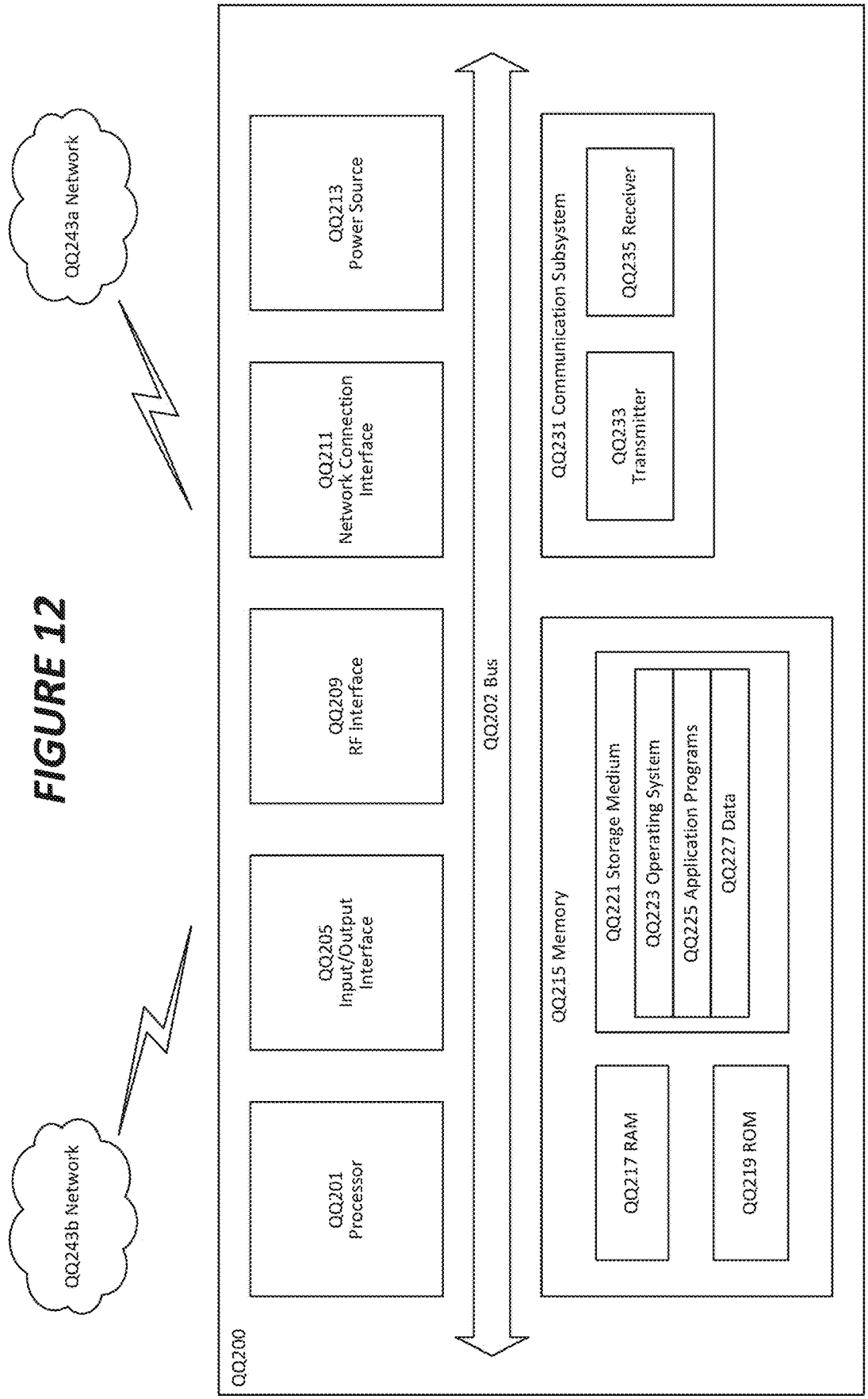
FIG. 12 is a block diagram of a user equipment in accordance with some embodiments

FIG. 12: User Equipment in accordance with some embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
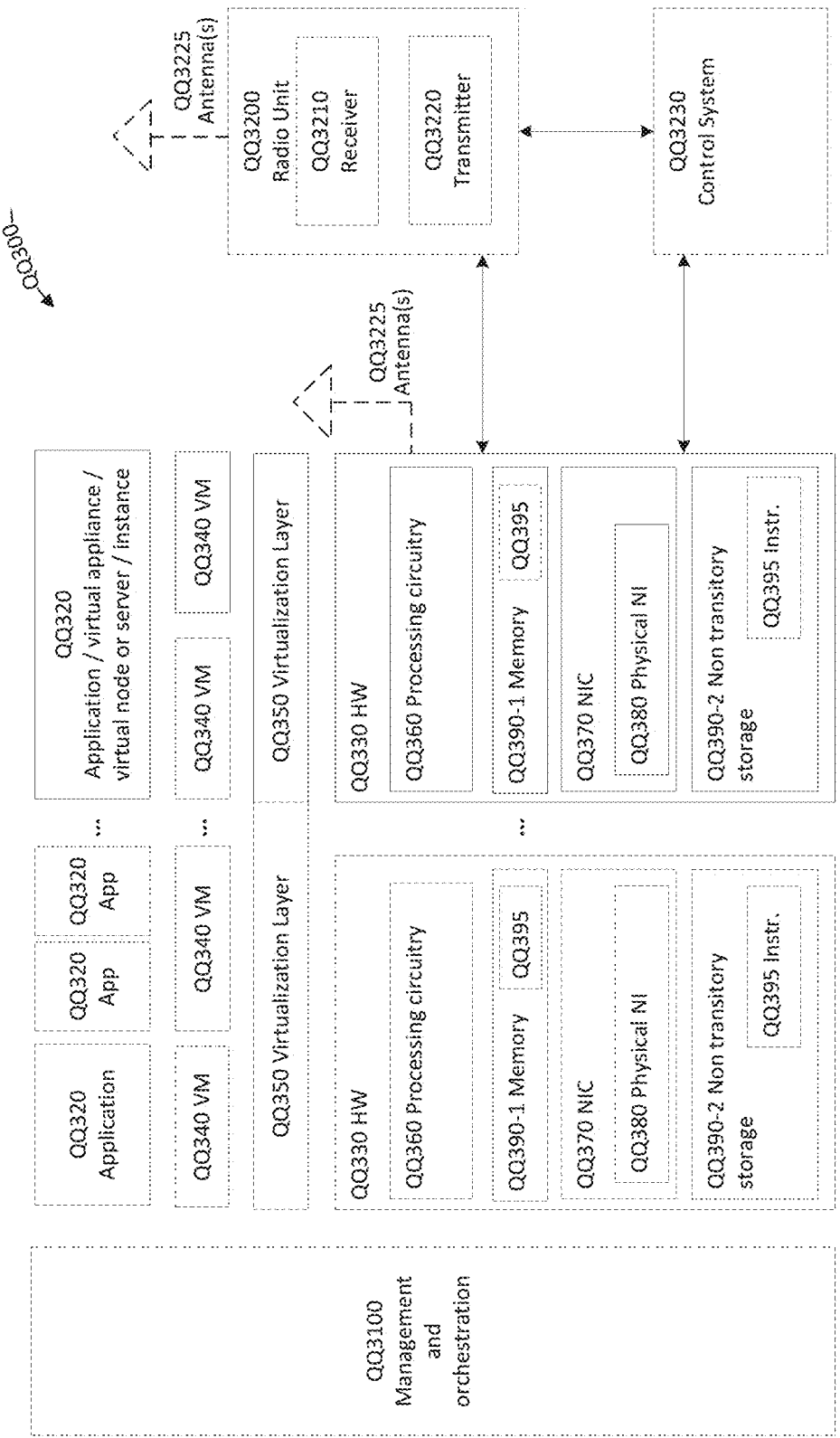
FIG. 13 is a block diagram of a virtualization environment in accordance with some embodiments.

FIG. 13: Virtualization environment in accordance with some embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 14:
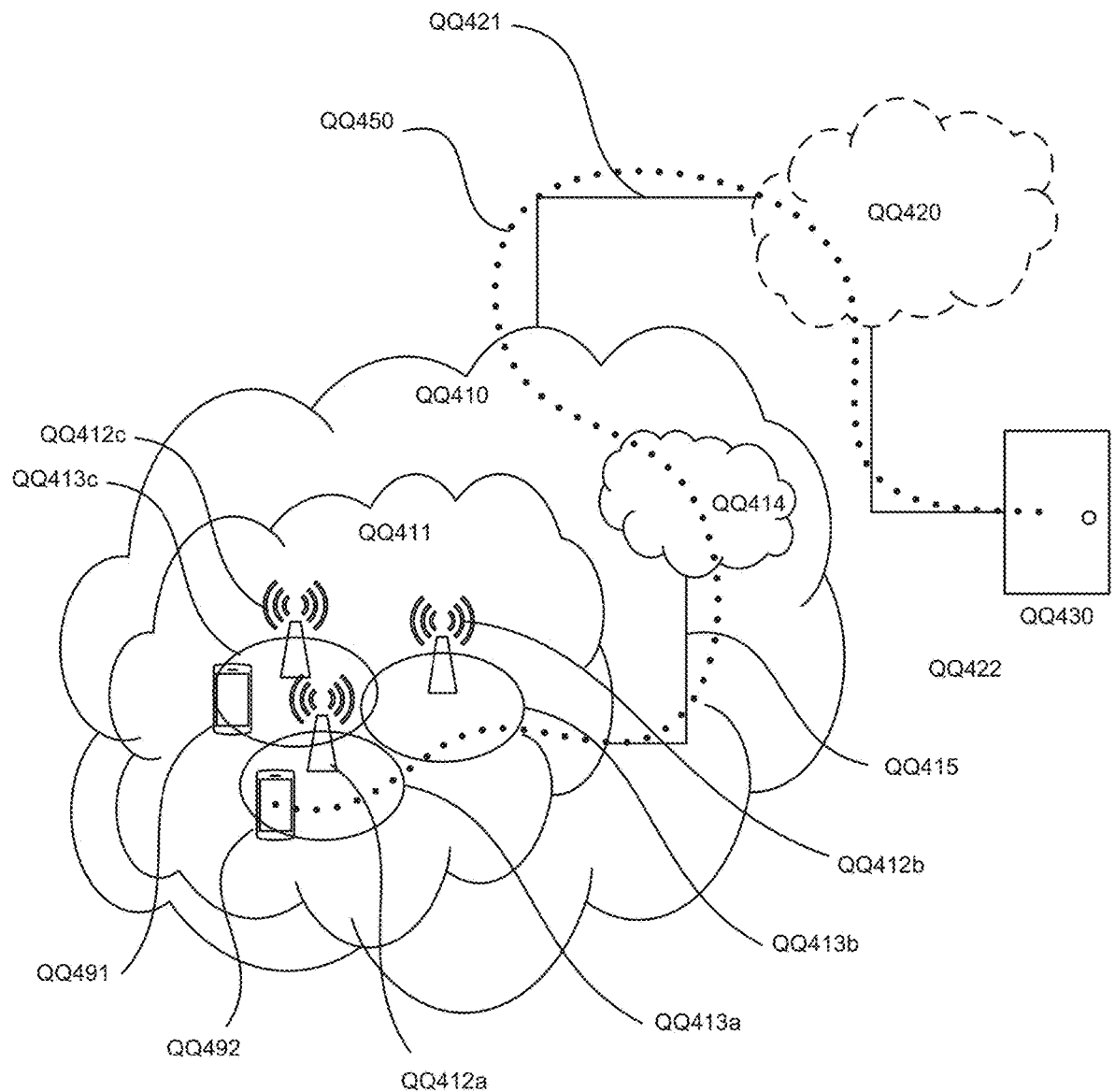
FIG. 14 is a block diagram of a telecommunication network connected via an intermediate network to a host computer in accordance with some embodiments.

FIG. 14: Telecommunication network connected via an intermediate network to a host computer in accordance with some embodiments.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
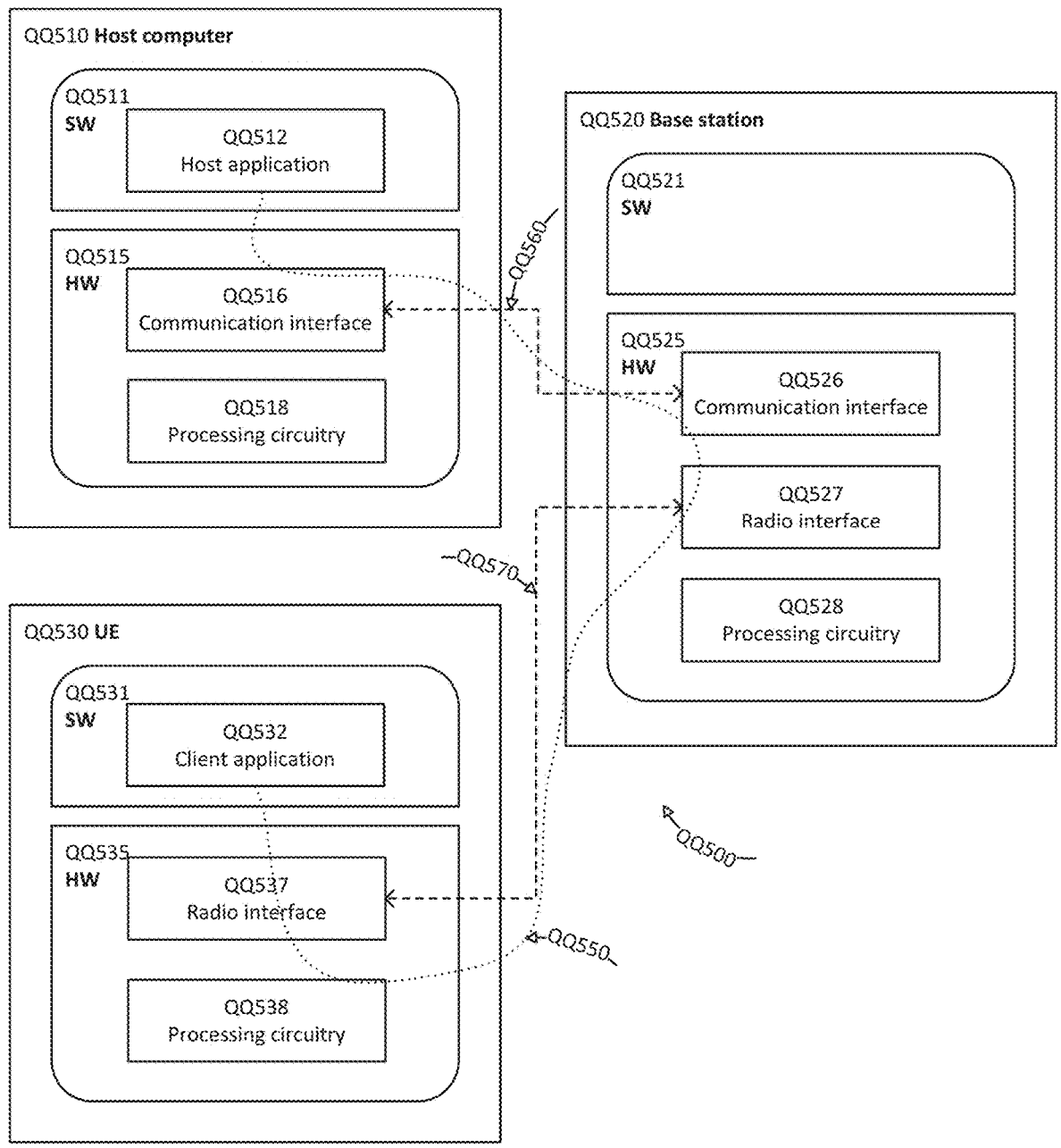
FIG. 15 is a block diagram of a host computer communicating via a base station with a user equipment over a partially wireless connection in accordance with some embodiments.

FIG. 15: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
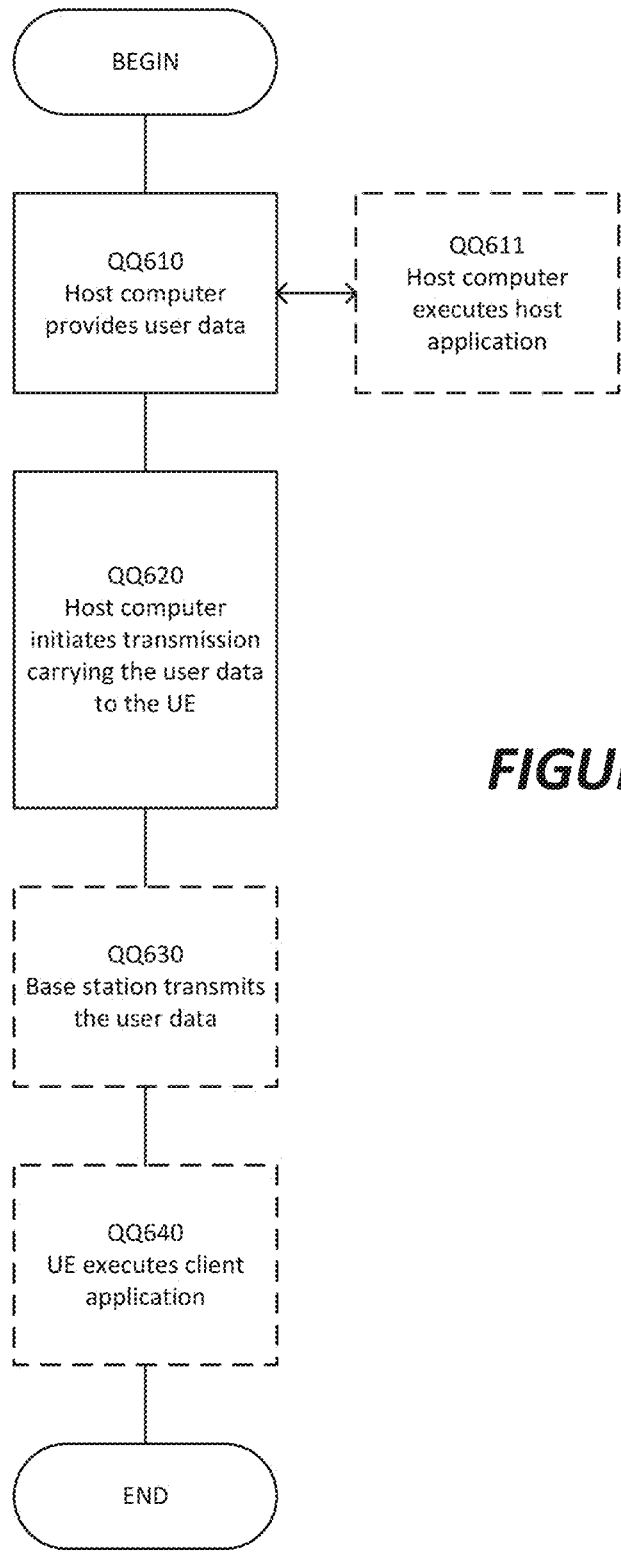
FIG. 16 is a block diagram of methods implemented in a communication system including a host computer, a base station, and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
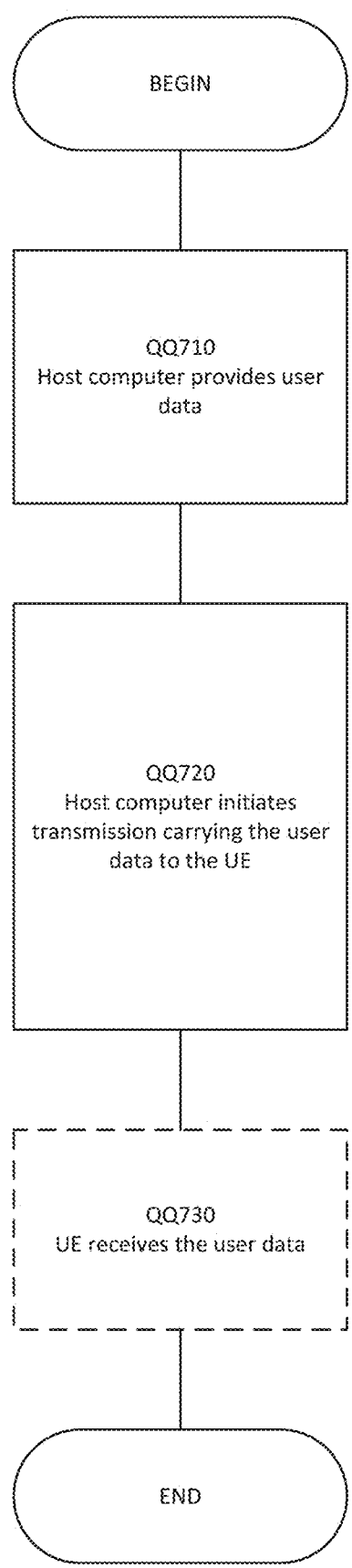
FIG. 17 is a block diagram of methods implemented in a communication system including a host computer, a base station, and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
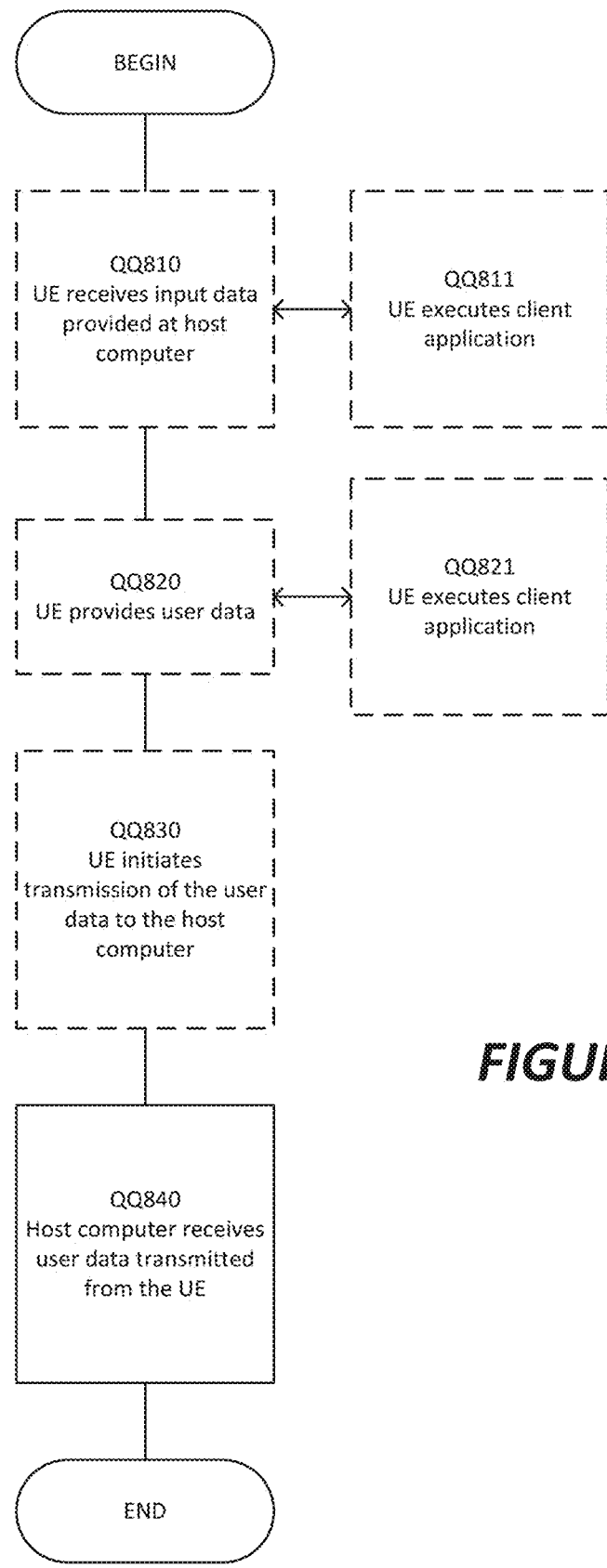
FIG. 18 is a block diagram of methods implemented in a communication system including a host computer, a base station, and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
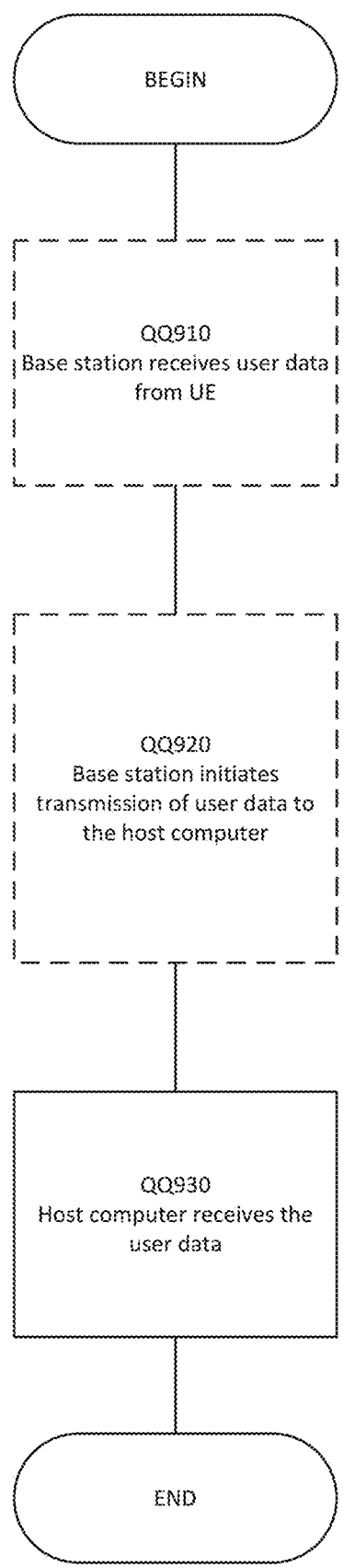
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A computer implemented method of training a reinforcement learning model for controlling a dynamic wireless communication system, comprising:
generating a trajectory sample of a simulated system that corresponds to the dynamic wireless communication system, the trajectory sample comprising a current state st of the simulated system at time t, an action at taken on the simulated system at time t according to a policy nt, a subsequent state st+i of the simulated system following the action at, and a reward r associated with the action at;
estimating a robust target value V' (st) for the trajectory sample, wherein the robust target value V' (St) comprises an expected value of a sum of the reward r and a minimum estimated value V' (st+i) of the simulated system at the subsequent state st+i based on a plurality of transition possibilities p from the current state st in response to the action at wherein estimating robust target value includes addition of robustness to the target value via robust Bellman equation;

updating a value function estimator based on the robust target value; and updating the policy based on the trajectory and the value function estimator.

2. The method of claim 1, wherein the defined region of the state space comprises an $L_2$ sphere $U_p(S_{t+1})$ within the state space centered on the subsequent state $S_{t+1}$ and having a radius p.

3. The method of claim 1, wherein performing the gradient search comprises:

generating a gradient of the value function with respect to the state s at each of the plurality of states within the defined state space;

taking a step along the gradient to a new point within the state space;

determining whether the new point is within the defined region of state space;

in response to determining that the new point is outside the defined region of state space, normalizing the step so that the new point is within the defined region of state space; and estimating the value function at the new point.

4. The method of claim 1, wherein the minimum estimated value V' (st+i) of the dynamic wireless communication system is a discounted future value.

5. The method of claim 1, further comprising: providing the policy to a system controller for controlling the dynamic wireless communication system using the updated policy.

6. The method of claim 5, wherein the state of the dynamic wireless communication system comprises a performance metric of the wireless communication system, and wherein the action comprises an uplink resource scheduling grant that allocates uplink transmission resources to a wireless terminal served by the wireless communication system.

7. The method of claim 5, wherein the state of the dynamic wireless communication system comprises a performance metric of the wireless communication system, and wherein the action comprises generation of a set of beamforming weights used to form a beam from a transceiver in the wireless communication system.

8. A policy training server, comprising:

a processing circuit; and a memory coupled to the processing circuit and comprising computer readable program instructions that, when executed by the processing circuit, cause the policy training server to perform operations according to:

generate a trajectory sample of a simulated system that corresponds to a dynamic wireless communication system, the trajectory sample comprising a current state $s_t$ of the simulated system at time t, an action $a_t$ taken on the simulated system at time t according to a policy π, a subsequent state $s_{t+1}$ of the simulated system following the action $a_t$, and a reward r associated with the action $a_t$;

estimate a robust target value $V^π(s_t)$ for the trajectory sample, wherein the robust target value $V^π(S_t)$ comprises an expected value of a sum of the reward r and a minimum estimated value $V^π(S_{t+1})$ of the simulated system at the subsequent state $S_{t+1}$ based on a plurality of transition possibilities p from the current state st in response to the action $a_t$, wherein estimating robust target value includes addition of robustness to the target value via robust Bellman equation;

update a value function estimator based on the robust target value; and update the policy based on the trajectory and the value function estimator.

9. A computer implemented method of training a reinforcement learning model for controlling a wireless communication system, comprising:

generating a trajectory sample of a simulated system that corresponds to the wireless communication system, the trajectory sample comprising a current state st of the simulated system at time t, an action $a_t$ taken on the simulated system at time t according to a policy π, a subsequent state $S_{t+1}$ of the simulated system following the action $a_t$, and a reward r associated with the action $a_t$;

estimating a robust target value $V^π(S_t)$ for the trajectory sample, wherein the robust target value $V^π(S_t)$ comprises an expected value of a sum of the reward r and a minimum estimated value $V^π(S_{t+1})$ of the simulated system at the subsequent state $S_{t+1}$ based on a plurality of transition possibilities p from the current state $s_t$ in response to the action $a^t$, wherein estimating robust target value includes addition of robustness to the target value via robust Bellman equation;

updating a value function estimator based on the robust target value; and updating the policy based on the trajectory and the value function estimator.

10. The method of claim 9, wherein generating the trajectory sample comprises:

estimating the current state $s_t$ at time t of the simulated system that corresponds to the wireless communication system;

simulating the action $a_t$ on the simulated system based on the current state $s_t$ according to the policy π;

sampling the subsequent state $S_{t+1}$ at time t+1 of the simulated system following the action $a_t$; and estimating the reward r associated with the action $a_t$.

11. The method of claim 9, further comprising generating the minimum estimated value $V^π(S_{t+1})$ of the simulated system at the subsequent state $s_{t+1}$ by estimating the value function at each of a plurality of target states near the subsequent state $S_{t+1}$ and selecting a minimum value of the value function at each of the plurality of target states.

12. The method of claim 11, wherein each of the plurality of target states is within a predefined distance from the subsequent state $S_{t+1}$.

13. The method of claim 11, wherein the plurality of target states are selected from within a defined region of a state space containing the subsequent state $S_{t+1}$, the method further comprising:

performing a gradient search of the value function within the defined region to find the minimum estimated value $V^π(S_{t+1})$.

14. The method of claim 13, wherein the defined region of the state space comprises an $L_2$ sphere $U_p(S_{t+1})$ within the state space centered on the subsequent state $S_{t+1}$ and having a radius p.

15. The method of claim 13, wherein performing the gradient search comprises:

calculating a gradient of the value function with respect to the state s at each of the plurality of states within the defined state space;

at each of the plurality of states within the defined state space, taking a step along the gradient to a new point within the state space;

determining whether the new point is within the defined region of state space;

in response to determining that the new point is outside the defined region of state space, normalizing the step so that the new point is within the defined region of state space; and estimating the value function at the new point.

16. The method of claim 9, wherein the minimum estimated value $V^\pi(S_{t+1})$ of the wireless communication system is a discounted future value.

17. The method of claim 9, further comprising:

providing the policy to a system controller for controlling the wireless communication system using the updated policy.

18. The method of claim 17, wherein the state of the wireless communication system comprises a channel measurement of the wireless communication system, and wherein the action comprises an uplink resource scheduling grant that allocates uplink transmission resources to a wireless terminal served by the wireless communication system.

19. The method of claim 17, wherein the state of the wireless communication system comprises a channel measurement of the wireless communication system, and wherein the action comprises generation of a set of beamforming weights used to form a beam from a transceiver in the wireless communication system.

20. A policy training server, comprising:

a processing circuit; and a memory coupled to the processing circuit and comprising computer readable program instructions that, when executed by the processing circuit, cause the policy training server to perform operations according to:

generate a trajectory sample of a simulated system that corresponds to a wireless communication system, the trajectory sample comprising a current state st of the simulated system at time t, an action at taken on the simulated system at time t according to a policy $\pi$, a subsequent state $s_{t+1}$ of the simulated system following the action $a_t$, and a reward r associated with the action $a_t$;

estimate a robust target value $V^\pi(s_t)$ for the trajectory sample, wherein the robust target value $V^\pi(S_t)$ comprises an expected value of a sum of the reward r and a minimum estimated value $V^\pi(S_{t+1})$ of the simulated system at the subsequent state $S_{t+1}$ based on a plurality of transition possibilities p from the current state st in response to the action $a_t$, wherein estimating robust target value includes addition of robustness to the target value via robust Bellman equation;

update a value function estimator based on the robust target value; and update the policy based on the trajectory and the value function estimator.

* * * * *